United States Patent Office 3,677,872
Patented July 18, 1972

3,677,872
HYDROXYLATED COPOLYMERS COMPOSED OF MONOMETHYLSILOXANE UNITS AND DIPHENYLSILOXANE UNITS
Robert C. Antonen, Midland, Mich., assignor to Dow Corning Corporation, Midland, Mich.
No Drawing. Original application Feb. 25, 1969, Ser. No. 802,217, now Patent No. 3,632,794. Divided and this application Oct. 27, 1970, Ser. No. 84,488
Int. Cl. B32b 17/04
U.S. Cl. 161—93         1 Claim

ABSTRACT OF THE DISCLOSURE

Hydroxylated copolymers of $(C_6H_5)_2SiO$ units and $CH_3SiO_{1.5}$ units are disclosed. The diphenylsiloxane units are present in an amount of 20 to 50 mol percent and are bonded to monomethylsiloxane units which contain the hydroxyl groups. Also disclosed are the above hydroxylated copolymers modified by linking segments of

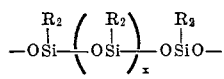

where $x$ is at least 2 and R is methyl, phenyl or 3,3,3-trifluoropropyl and the segments are present in amounts of 1 to 50 weight percent. The hydroxylated copolymers and the modified hydroxylated copolymers are resins useful in protective coatings, laminates, release coatings and molding resins.

---

This is a division of application Ser. No. 802,217, filed Feb. 25, 1969, now U.S. Pat. No. 3,632,794.

This invention relates to resinous organosiloxane copolymers having silicon-bonded hydroxyl functionality. More particularly, this invention relates to copolymers of monomethylsiloxane units and diphenylsiloxane units having silicon-bonded hydroxyl functionality on the monomethylsiloxane units wherein each of the diphenylsiloxane units are bonded to monomethylsiloxane units.

Organosiloxane copolymers are well known in the art, such as those described in U.S. Letters Pat. No. 2,486,162, issued to James Franklin Hyde on Oct. 25, 1949. Hyde describes the preparation of organosiloxane copolymers by hydrolyzing mixtures of organosilanes, such as the chlorosilanes. Hyde describes 14 classes of copolymers which include all the possible combinations which can be made from $SiO_2$ units, $R'SiO_{1.5}$ units $R'_2SiO$ units and $R'_3SiO_{0.5}$ units where R' is an organic radical. Hyde's organosiloxane copolymers range from dimers, to fluids, to solids, to resins, to insoluble gels. Hyde is thus a comprehensive work which teaches a broad spectrum of organosiloxane copolymers. Hyde teaches a class of organosiloxane copolymers comprising $R'Si\equiv$ units and $R'_2Si=$ units. Hyde, furthermore, teaches organosiloxane copolymers composed of monomethylsiloxane units and diphenylsiloxane units in molar ratios of 1 to 1, 2 to 1 and 4 to 1 respectively.

The copolymers described by Hyde prepared from the monomethylsiloxane units and the diphenylsiloxane units are random copolymers, are thermoplastic and have high weight loss upon heating whereas the copolymers of the present invention provide thermosetting resins in a defined structural arrangement and have low weight loss upon heating. The amount of weight loss upon heating is particularly important inasmuch as the higher the weight loss the greater the amount of shrinkage observed between the uncured resin and the cured product.

It is therefore an object of the present invention to provide a copolymer of monomethylsiloxane units and diphenylsiloxane units which is rapidly curing, thermosetting, and of low weight loss upon curing. This object and others will become apparent from the following detailed description of the present invention.

The present invention relates to a hydroxylated monomethylsiloxane-diphenylsiloxane copolymer consisting essentially of monomethylsiloxane units and diphenylsiloxane units in which the diphenylsiloxane units are present in an amount of from 20 to 50 inclusive mol percent based on the total number of siloxane units present in said hydroxylated monomethylsiloxane-diphenylsiloxane copolymer, at least 95 percent of the total number of diphenylsiloxane units having each unsatisfied valence of each diphenylsiloxane unit satisfied by a monomethylsiloxane unit, said hydroxylated monomethylsiloxane-diphenylsiloxane copolymer containing from 0.4 to 10 weight percent silicon-bonded hydroxyl radicals based on the total weight of the copolymer and said hydroxyl radicals consisting essentially of hydroxyl radicals bonded to the monomethylsiloxane units.

The present invention also relates to a modified hydroxylated monomethylsiloxane-diphenylsiloxane copolymer consisting essentially of the hydroxylated monomethylsiloxane-diphenylsiloxane copolymer defined above wherein hydroxylated monomethylsiloxane-diphenylsiloxane copolymer molecules are linked together with segments consisting essentially of a diorganosiloxane of the formula

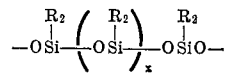

where each R is a monovalent radical selected from the group consisting of a methyl radical, a phenyl radical and a 3,3,3-trifluoropropyl radical and $x$ has an average value of at least 2, no more than 50 percent of the total number of R radicals being a monovalent radical selected from the group consisting of phenyl radicals and 3,3,3-trifluoropropyl radicals, the terminal oxygen atoms of the segments being substituted for hydroxyl groups of the hydroxylated monomethylsiloxane-diphenylsiloxane copolymer and said segments being present in an amount of from 1 to 50 weight percent based on the total weight of the modified hydroxylated monomethylsiloxane-diphenylsiloxane copolymer.

The hydroxylated monomethylsiloxane-diphenylsiloxane copolymer of the present invention is composed of two basic organosiloxane units, namely, monomethylsiloxane units and diphenylsiloxane units. The diphenylsiloxane units, for all practical purposes, are surrounded by monomethylsiloxane units. By this it is to be understood that the diphenylsiloxane unit will be present in one of the following structural arrangements:

(A) 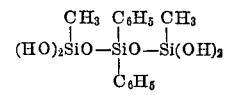

(B) 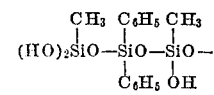

(C) 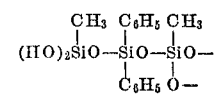

(D) 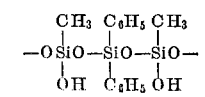

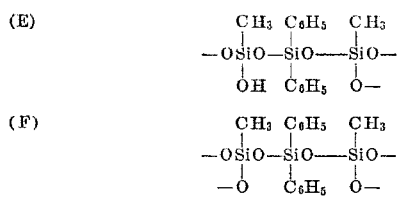

Any other structural arrangements involving the diphenylsiloxane unit and its two bonded adjacent neighboring units will be present in small percentages, such as wherein one or both of the two bonded adjacent neighboring units are other diphenylsiloxane units. Small percentages refers to 5 mol percent or less. Thus, the hydroxylated monomethylsiloxane-diphenylsiloxane copolymer has at least 95 percent of the total number of diphenylsiloxane units having each unsatisfied valence of each diphenylsiloxane unit satisfied by monomethylsiloxane units. The number of diphenylsiloxane units bonded to monomethylsiloxane units which have two hydroxyl groups such as in (A), (B) and (C) above, will be present in small amounts, since two hydroxyls on a monomethylsiloxane unit is a rather unstable arrangement and most of these units will condense to provide arrangements such as in (D), (E) and (F). Since the chain terminating units, such as $(HO)_2CH_3SiO-$ are present in small amounts, the molecular weights will usually be 1000 or more.

By the term "consisting essentially of" in the phrase "hydroxyl radicals consisting essentially of hydroxyl radicals bonded to the monomethylsiloxane units," it is to be understood that any hydroxyl radicals bonded to the diphenylsiloxane units are not observed and are thus not detected in the hydroxylated monomethylsiloxane-diphenylsiloxane copolymer.

The best method for preparing the hydroxylated monomethylsiloxane-diphenylsiloxane copolymers of the present invention is to first prepare an acetoxymonomethylsiloxane-diphenylsiloxane copolymer and then hydrolyze the acetoxymonomethylsiloxane-diphenylsiloxane copolymer. The acetoxymonomethylsiloxane-diphenylsiloxane copolymer is prepared by mixing methyltriacetoxysilane and diphenylsilanediol at room temperature whereby an exotherm will be observed, preferably the diphenylsilanediol is added to the methyltriacetoxysilane. The desired molar ratio of monomethylsiloxane to diphenylsiloxane in the hydroxylated monomethylsiloxane-diphenylsiloxane copolymer is determined prior to mixing and the corresponding molar ratio of diphenylsilanediol and methyltriacetoxysilane are then mixed. It is unnecessary to use a solvent or to heat the mixture since the reaction proceeds exothermally at room temperature and goes to completion in a short period of time, such as from 15 minutes to an hour. The reaction produces acetic acid as a by-product and this can be stripped from the resulting acetoxymonomethylsiloxane-diphenylsiloxane copolymer by heating the mixture under reduced pressure. The resulting acetoxymonomethylsiloxane - diphenylsiloxane copolymer either with or without the by-produced acetic acid is mixed with an organic solvent such as toluene or xylene to provide a solution, such as 30 to 60 weight percent copolymer in solvent. The solvent solution of the copolymer is then added to water in a sufficient quantity, usually an excess, to hydrolyze all the acetoxy groups. The hydrolysis is exothermic and the mixture is stirred from 15 minutes to an hour to insure complete hydrolysis. The acetic acid-water layer is then decanted from the solvent product layer. The product is then washed with water, hot water is preferable, to remove any remaining acetic acid. The resulting product is then azeotroped to remove any remaining water. The product is a hydroxylated monomethylsiloxane-diphenylsiloxane copolymer of the present invention.

The method for making the acetoxymonomethylsiloxane-diphenylsiloxane copolymer can be modified in several ways to obtain an acetoxymonomethylsiloxane-diphenylsiloxane copolymer. One such method is as follows. An acetoxymonomethylsiloxane-diphenylsiloxane copolymer containing 43 mol percent diphenylsiloxane units can be made by adding 3 moles of diphenylsilanediol to 4 moles of methyltriacetoxysilane. The same acetoxymonomethylsiloxane-diphenylsiloxane copolymer can also be made by adding 1 mole of diphenylsilanediol to 2 moles of methyltriacetoxysilane to produce an acetoxymonomethylsiloxane-diphenylsiloxane copolymer which can be represented by the formula

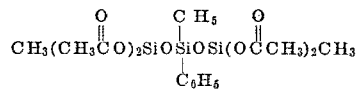

To this acetoxymonomethylsiloxane-diphenylsiloxane copolymer, 0.5 mole of diphenylsilanediol is then added per mole of the acetoxymonomethylsiloxane-diphenylsiloxane copolymer and the resulting product can be represented by the formula

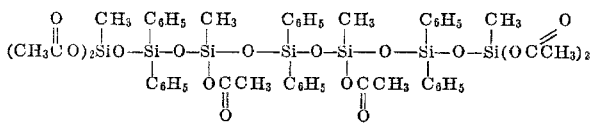

Higher molecular weight acetoxymonomethylsiloxane-diphenylsiloxane copolymers can be made, for example, wherein the molecular weight is approximately doubled, by adding an increment of 0.5 mole of diphenylsilanediol per mole of starting acetoxymonomethylsiloxane-diphenylsiloxane copolymer. Other increments of diphenylsilanediol can be used with corresponding results which are readily apparent to those skilled in the art.

Hydrolysis of these acetoxymonomethylsiloxane-diphenylsiloxane copolymers will produce the hydroxylated monomethylsiloxane-diphenylsiloxane copolymers of the present invention with corresponding molar ratios of monomethylsiloxane units to diphenylsiloxane units.

The above methods can be readily used to prepare acetoxymonomethylsiloxane-diphenylsiloxane copolymers wherein the mol percentages of diphenylsiloxane units is from 33.3 to 50 percent. Although one molecule of diphenylsilanediol can react with no more than two moles of methyltriacetoxysilane, lower mole percentages of diphenylsilanediol than 33.3 percent can be used in the above methods to prepare hydroxylated monomethylsiloxane-diphenylsiloxane copolymers. If a hydroxylated monomethylsiloxane-diphenylsiloxane copolymer with less than 33.3 mol percent diphenylsiloxane units is desired, the corresponding mole percentages of diphenylsilanediol and methyltriacetoxysilane are used. In this case, the excess methyltriacetoxysilane remains unreacted since there is not enough available diphenylsilanediol to react with it. Upon hydrolysis, the unreacted methyltriacetoxysilane hydrolyzes and condenses with itself and the hydrolysis products of the acetoxymonomethylsiloxane-diphenylsiloxane copolymer and the final product will be a hydroxylated monomethylsiloxane - diphenylsiloxane copolymer with less than 33.3 mol percent diphenylsiloxane units. Although this method can be used to prepare the hydroxylated monomethylsiloxane-diphenylsiloxane copolymers of the present invention, other methods are preferred. The unreacted methyltriacetoxysilane when hydrolyzed can readily form gel particles which precipitate from the copolymer solution. The gel particles can be avoided by controlling the rate of hydrolysis, but such techniques require additional time and thus additional expenses.

The following method can be used to prepare hydroxylated monomethylsiloxane-diphenylsiloxane copolymers with less than 33.3 mol percent diphenylsiloxane units wherein the difficulties of the foregoing method are avoided. Hydroxylated monomethylsiloxane - diphenylsiloxane copolymers having from 20 to 33.3 mol percent diphenylsiloxane units can best be prepared by the following method. An acetoxymonomethylsiloxane-diphenylsiloxane copolymer is prepared by adding a calculated amount of water to the methyltriacetoxysilane to hydrolyze the desired number of acetoxy groups and condense the resulting silanols to form a siloxane bond, prior to adding the diphenylsilanediol to the methyltriacetoxysilane. For example, if one mole of water is added to two moles of methyltriacetoxysilane, the resulting product would be essentially a dimer, such as illustrated by the following equation:

(I)

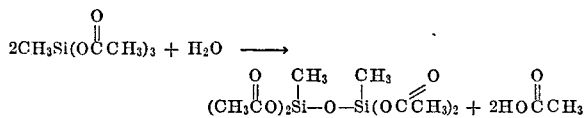

It is to be understood that the above equation is illustrative only for the idealized situation and that the final product would be a mixture of products which would average out to this formula. However, if water is slowly added to the methyltriacetoxysilane, the results are essentially as shown by Equation I.

When 1 mole of diphenylsilanediol is added to 4 moles of methyltriacetoxysilane which has first been treated in the manner of Equation I, the final product will be 20 mol percent diphenylsiloxane, and the average formula can be illustrated as follows:

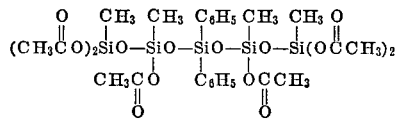

If the molar ratio of water to methyltriacetoxysilane is less than 1:2, the amount of diphenylsiloxane in the acetoxymonomethylsiloxane-diphenylsiloxane copolymer can be varied accordingly between 20 and 33.3 mol percent when the methyltriacetoxysilane is first treated with water. Hydrolysis of the above acetoxymonomethylsiloxane-diphenylsiloxane copolymer having 20 mol percent diphenylsiloxane units will provide a hydroxylated monomethylsiloxane-diphenylsiloxane copolymer having 20 mol percent diphenylsiloxane units without the gel particle formation. Hydrolysis of other acetoxymonomethylsiloxane-diphenylsiloxane copolymers described above will provide the corresponding hydroxylated monomethylsiloxane-diphenylsiloxane copolymers.

The molecular weight of the acetoxymonomethylsiloxane-diphenylsiloxane copolymers can be increased by adding defined amounts of water to them to hydrolyze and condense a calculated amount of acetoxy groups. One mole of water will hydrolyze 2 moles of acetoxy groups and the resulting silanols will condense to produce one mole of ≡Si—O—Si≡. The correct amount of water can thus be calculated to completely hydrolyze all the acetoxy groups from the acetoxymonomethylsiloxane-diphenylsiloxane copolymers and a calculated excess can be determined, where desired.

The above methods for preparing the hydroxylated monomethylsiloxane-diphenylsiloxane copolymers can be used as long as the described limits are met. The percentages of diphenylsiloxane units in the hydroxylated monomethylsiloxane-diphenylsiloxane copolymer can vary from 20 to 50 inclusive mol percent based on the total number of moles of organosiloxane units in the hydroxylated monomethylsiloxane - diphenylsiloxane copolymer. The amount of hydroxyl is to be maintained from 0.4 to 10 weight percent based on the total weight of the hydroxylated monomethylsiloxane-diphenylsiloxane copolymer. The most preferred hydroxylated monomethylsiloxane-diphenylsiloxane copolymers are those having from 1 to 7 weight percent hydroxyl radicals.

By the phrase "copolymer consisting essentially of," it is to be understood that the hydroxylated monomethylsiloxane-diphenylsiloxane copolymers and the modified variations can also contain unhydroylzed hydrolyzable groups besides the required amount of hydroxyl radicals. The hydroxylated monomethylsiloxane-diphenylsiloxane copolymers and the modified variations which contain hydrolyzable groups are prepared by using less than theory water to hydrolyze the hydrolyzable copolymers in any of the methods of hydrolysis disclosed herein.

The hydroxylated monomethylsiloxane - diphenylsiloxane copolymers described above can be modified by linking molecules of the hydroxylated monomethylsiloxane-diphenylsiloxane copolymer together with diorganosiloxane segments of the formula

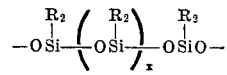

where $x$ is at least 2, preferably 2 to 1000, and each R is a methyl radical, a phenyl radical or a 3,3,3-trifluoropropyl radical. No more than 50 percent of the R radicals are phenyl or 3,3,3-trifluoropropyl. The segments can be present in an amount of from 1 to 50 weight percent.

The hydroxylated monomethylsiloxane - diphenylsiloxane copolymer can best be modified by mixing the acetoxymonomethylsiloxane-diphenylsiloxane copolymers described above with a methyldiacetoxysiloxy endblocked polydiorganosiloxane and thereafter hydrolyzing the mixture in the same manner as the acetoxymonomethylsiloxane-diphenylsiloxane copolymers are hydrolyzed to produce the hydroxylated monomethylsiloxane-diphenylsiloxane copolymers.

The methyldiacetoxysiloxy endblocked polydiorganosiloxanes can readily be prepared by reacting methyltriacetoxysilane with hydroxyl endblocked diorganosiloxane polymers represented by the formula

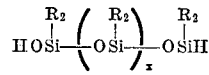

wherein R and $x$ are defined above. Examples of these hydroxyl endblocked diorganosiloxane polymers include among others polydimethylsiloxane, polyphenylmethylsiloxane, poly - 3,3,3-trifluoropropylmethylsiloxane, mixtures thereof and hydroxyl endblocked copolymers containing two or more units of a dimethylsiloxane unit, a phenylmethylsiloxane unit, a diphenylsiloxane unit or a 3,3,3 - trifluoropropylmethylsiloxane unit. The hydroxyl endblocked diorganosiloxane polymer is mixed with methyltriacetoxysilane, wherein the methyltriacetoxysilane can be added in excess, and the reaction proceeds exothermally. If excess methyltriacetoxysilane is used, the excess can be removed by vacuum stripping after the reaction has taken place to produce the methyldiacetoxysiloxy endblocked diorganosiloxane polymer. Other monomethylsilanes can be used to endblock the diorganosiloxane polymer in place of the methyltriacetoxysilane as long as they can react with the silanols of the diorganosiloxane polymers, such a monomethylsilane is methyltriketoximesilane.

Alternatively the hydroxyl endblocked diorganosiloxane polymer can be mixed with the acetoxymonomethylsiloxane-diphenylsiloxane copolymer in the presence of an inert organic solvent for the polymers such as toluene, xylene, and the like. The mixture is preferably heated from room temperature to 150° C. for 30 minutes up to about 5 hours, usually 1 to 2 hours is sufficient to achieve complete reaction. If desired, catalyst known for the silanol-acetoxy reaction can be used, however, the reaction proceeds satisfactorily without such a catalyst. The product obtained can then be hydrolyzed in the manner described above to produce a modified hydroxylated monomethylsiloxane-diphenylsiloxane copolymer.

The hydroxylated monomethylsiloxane - diphenylsiloxane copolymers of this invention are useful as release coatings, protective coatings, laminating resins, molding resins, impregnating varnishes and wire coatings. The hydroxylated monomethylsiloxane - diphenylsiloxane copolymers are strong resins when cured compared to similar prior art resins, they cure to tough materials, cure rapidly, possess good shelf stability, the cured films have excellent weatherability, are flexible and hard and adhere to most substrates such as steel, glass, aluminum and wood. The modified hydroxylated monomethylsiloxane-diphenylsiloxane copolymers are particularly useful as release coatings and protective coatings such as paints. The modified hydroxylated monomethylsiloxane-diphenylsiloxane copolymers best suited as release coatings are those containing 1 to 10 weight percent polydimethylsiloxane segments of 4 to 100 siloxane units, thus $x$ is 2 to 98. The modified hydroxylated monomethylsiloxane-diphenylsiloxane copolymers best suited for protective coatings, such as paints, are those which contain 15 to 20 weight percent of polydimethylsiloxane segments of 4 to 100 siloxane units thus $x$ is 2 to 98.

The hydroxylated monomethylsiloxane - diphenylsiloxane copolymers of the present invention and the modified variations are fast curing copolymers compared to prior art copolymers having as high a diphenylsiloxane content. The fast cure is attributed to the hydroxyl radicals being bonded to the monomethylsiloxane units instead of to the diphenylsiloxane units.

The hydroxylated monomethylsiloxane - diphenylsiloxane copolymers and the modified variation of this invention can be cured by heat alone, by other conventional catalyst for the condensation of silanols, such as metal salts, or any of the other conventional crosslinkers.

The following examples are illustrative only and should not be construed as limiting the present invention which is properly delineated in the claims. A number of property determinations and tests are described in the examples including the following.

Solids determination

The percent solids is determined by placing a three gram sample in a tared aluminum cup. The cup is then placed in a 135° C. air circulating oven for 3 hours. The residual weight divided by the original weight times 100 is the percent solids which is in weight percent. All percent solids in the examples are determined in this manner. Most of the weight lost during the solids determination can be contributed to the weight of solvents volatilized, however, some of the weight loss comes from the condensation of the silicon-bonded hydroxyl radicals, particularly when the percentage of the silicon-bonded hydroxyl radicals is high.

Weight loss determination

The residue from the solids determination is heated in an air circulating oven for 3 hours at 250° C. The weight difference between the solids weight and the weight after the 3 hour heating period divided by the solids weight times 100 is the percent weight loss. The weight loss is also determined after 24 hours at 250° C. and after 100 hours at 250° C. The weight loss is determined at 250° C. unless otherwise specified.

Test panel preparation

A hydroxylated monomethylsiloxane-diphenylsiloxane copolymer or the modified variation were diluted to 20 weight percent solids in chlorothene or xylene and catalyzed with iron, added as iron octoate, based on the total weight of the hydroxylated monomethylsiloxane-diphenylsiloxane copolymer or the modified variation which ever was appropriate. The catalyzed solution was spray coated on test panels to an approximate dry film thickness of 0.2 mils and then the coated test panels were baked at 232° C. for one hour. The amount of iron catalyst used was 0.05 weight percent unless otherwise specified.

Tape pull test

A ten inch length of one inch wide Johnson and Johnson adhesive tape was placed on a coated aluminum test panel and pressed firmly to the surface with a rubber roller. The resulting assembly was then heated for 5 minutes in a 100° C. oven. The test panel was removed from the oven and immediately pressed with the rubber roller. The test panel was allowed to cool to room temperature and the tape release was measured with the Keil tester (180° pull) in units of grams per inch.

The tape pull test, as well as some of the other tests, was also conducted on test panels which received isopropyl alcohol extraction for periods of 10, 60 and 120 minutes. The isopropyl alcohol extraction was accomplished by placing the test panel in isopropyl alcohol wherein the isopropyl alcohol is agitated by an agitator rotating at 100 revolutions per minute.

Egg release test

A coated aluminum test panel was placed on a 149° C. hot plate until the test panel reached equilibrium temperature. On the heated test panel, about 0.5 g. of egg white was placed and fried until it was thoroughly coagulated. The edge of the fried egg was then lifted with a steel spatula. The ease of release was rated as follows:

very poor=cannot be removed
poor=can be partially removed
fair=can be peeled off without breaking
good=readily removed when lifted with the spatula
very good=slides when attempting to put spatula under edge of egg The egg release test was also conducted on test panels which had been extracted with isopropyl alcohol as defined herein.

Pizza burn test

Into a coated aluminum test tray coated in the same manner as the test panels, 70 g. of Chef-Boy-Ar-Dee pizza sauce was placed. The coated tray containing the pizza sauce was then heated for 45 minutes at 232° C. The tape pull release as described herein was determined after removing the pizza sauce and washing the tray with a hot Dreft solution to insure removal of any traces of oil and drying the tray. The tape pull release was determined in most instances after each pizza burn test in a series of three pizza tests.

Oil resistance test

A commercial cooking oil was heated for 24 hours at 260° C. The oil was then heated to 325° C. Steel test panels which had been coated with the hydroxylated monomethylsiloxane-diphenylsiloxane copolymer or the modified variation as described above. The cured coated test panels were then suspended in the vapors over the heated oil for 5 minutes. The test panels were then cooled and a three pound hammer which was wrapped in cheese cloth was pulled across the surface until the surface marred or a maximum of 25 times if marring did not occur. When the maximum number of pulls occur, the test panel is then suspended over the hot oil vapors for another 5 minutes and the hammer was again pulled across the surface of the coated test panel as described above. Each 5 minute heating in the hot oil vapors and 25 hammer pulls is considered a cycle.

Hot tack test

Films of the coating are cured on aluminum panels, cooled and covered by a one inch square piece of kraft paper. A 150 g. weight is then placed on the paper and this assembly is placed in a 150° C. oven for 15 minutes. The assembly is removed and allowed to cool before removing the weight. The following hot tack ratings are given to the coating according to the following system.

| Rating: | Observation |
|---|---|
| 1 | If the panel is inverted and the paper freely falls. |
| 2 | If the panel is inverted and the paper freely falls after the panel has been sharply rapped. |
| 3 | If a violent shaking is required to loosen the paper. |
| 4 | If the paper falls after being lightly touched. |
| 5 | If the paper has to be pulled from the panel. |

This test shows the cure of the coating and thermoplasticity. A well-cured film will have the lower ratings.

Film flex test

A mandrel flex test is used for films having the lower flexibility. A test panel having a cured coating is wrapped around a mandrel of a specified diameter. The smallest diameter around which the panel can be bent without cracking the film is the mandrel flex. The film at the bend is observed under a 7 power magnifying glass to see if any cracks in the film are present. Interchangeable mandrels are provided in diameters from ⅛ inch to 1 inch.

Cured films which have a flexibility which is better than a ⅛ inch mandrel are tested for flexibility by the T bend flexibility test. An aluminum test panel is coated and then cured to provide a cured film thickness of about one mil. One end of the test panel is folded about 0.5 to 1 inch from the end of the test panel so that the film lies on the outside of the fold and the two uncoated surfaces of the test panel form the inside walls of the fold and lie side by side. Since nothing separates these uncoated portions, the fold is said to provide the film with a 0T bend.

The film, at the point of the bend or fold, is observed under a 7 power magnifying glass and if the film contains no cracks it is given a rating of 0T. However, if the film contains cracks, it fails the 0T flex and one then proceeds in the following manner.

The test panel is now folded about the line of contact between the test panel and the folded-over panel end; i.e., at about one inch to two inches from the end of the test panel depending upon the size of the first fold, in the direction such that the film lies on the outside of the fold. In other words, the end is again folded such as one would fold the end of a toothpaste tube. The fold will now contain one thickness of test panel or 25 mils between the newly folded portions. Since the newly formed fold is separated by one panel thickness, the film is said to have a 1T bend. The film, at the point of the bend, is observed under the 7 power magnifying glass and if the film contains no cracks it is given a rating of 1T. However, if the film contains cracks it fails the 1T flex and in the manner just described the test panel is again folded to provide two thicknesses of panel between the newly formed fold. A film which passes this bend is given a 2T flex rating.

This operation is repeated to provide 3, 4 and 5 thicknesses of test panel between the fold. The corresponding ratings of 3T, 4T and 5T are given if the film passes the inspection. A 5T bend and rating is approximately equivalent to a ⅛ inch mandrel flex.

EXAMPLE 1

A flask equipped with a stirrer and a thermometer was charged with 586 g. (2.66 moles) of methyltriacetoxysilane and agitation was started prior to the addition of 290 g. (1.34 mole) of diphenylsilanediol. The addition time for the diphenylsilanediol was 4 minutes. The temperature of the mixture increased from 25° C. to 60° C. from the exothermic reaction. The agitation was continued for 30 minutes at which time the contents of the flask had cleared. The product was then vacuum stripped to 146° C. at 36 mm. of Hg to remove the by-produced acetic acid. The product had 44.0 weight percent acetoxy groups, no detectable ≡SiOH, a ≡SiC₆H₅ to ≡SiCH₃ ratio of 1:1 and a

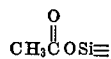

to ≡SiCH₃ ratio of 2:1 which is consistent with the following structural formula wherein the theory acetoxy is 44.0 weight percent:

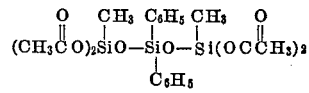

The product would not cure when a film was exposed to air overnight but cured to a hard, slightly flexible film when heated at 232° C. for 2 hours.

A mixture of 100 g. of the above acetoxymonomethylsiloxane-diphenylsiloxane copolymer and 80 g. of xylene was prepared in a separatory funnel. To the resulting mixture, 500 cc. of water was added and then agitated for 4 minutes. The mixture formed three layers, 100 g. of toluene was added and two layers formed. The aqueous bottom layer was removed and the solvent-product layer was washed three times with water. The solvent-product layer was then azeotroped to 114° C. to remove any excess water. The resulting solution was clear and contained 53 g. of a hydroxylated monomethylsiloxanediphenylsiloxane copolymer which contained 7.4 weight percent silicon-bonded hydroxyl radicals and which was 21.3 percent solids and had a 1.3 percent weight loss after 3 hours. The hydroxylated monomethylsiloxane-diphenylsiloxane copolymer cured to a hard film when dried in air.

EXAMPLE 2

To 1000 g. of hydroxyl endblocked poly - 3,3,3 - trifluoropropylmethylsiloxane having 5.4 weight percent silicon-bonded hydroxyl radicals and an average of 4 3,3,3-trifluoropropylmethylsiloxane units per molecule, 700 g. of methyltriacetoxysilane was rapidly added. The temperature of the mixture increased from 27° C. to 70° C. The mixture was stirred for 1.5 hours and then vacuum stripped to 155° C. at 30 mm. Hg. The resulting product had an average formula

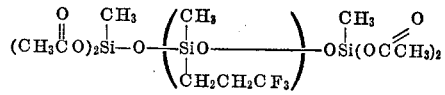

A mixture of 7.9 g. of the

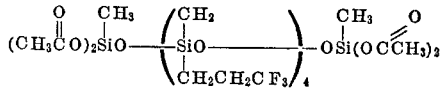

prepared above, 63.0 g. of

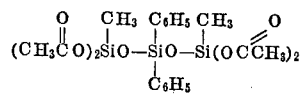

prepared in Example 1 and 7.9 g. of methyltriacetoxysilane was placed in a 500 ml. flask. Water was added very slowly from a dropper to the mixture over a 5 minute period. The temperature during this addition period increased from 23° C. to 60° C. Water was added until enough was present to hydrolyze all the acetoxy groups, 60 g. of toluene was then added, and an excess of water to insure that a sufficient amount of water was present to hydrolyze the acetoxy groups. The mixture was then stirred for one hour and thereafter it was washed three times with hot water. The washed product was azeotroped to remove all the remaining water. The resulting product was a modified hydroxylated monomethylsiloxane-diphenylsiloxane copolymer having 29 mol percent diphenylsiloxane units and 71 mol percent monomethylsiloxane units based on the total number of diphenylsiloxane units and monomethylsiloxane units and 6.3 weight percent silicon-bonded hydroxyl radicals. The modified hydroxylated monomethylsiloxane-diphenylsiloxane copolymers was 10 weight percent

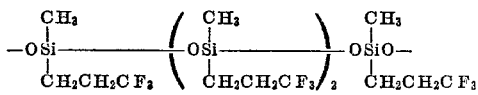

The modified hydroxylated monomethylsiloxane-diphenylsiloxane copolymer cured to a hard film when catalyzed with ferric octoate and heated for 10 minutes at 232° C.

EXAMPLE 3

A mixture of 60.0 g. of the

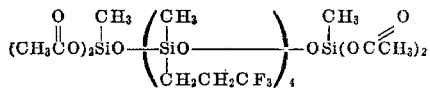

prepared in Example 2, 120 g. of

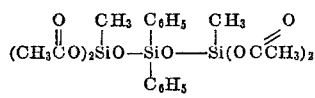

prepared in Example 1 and 20 g. of methyltriacetoxysilane was placed in a flask. Water was added very slowly from a dropper to the mixture over an 8 minute period. The temperature during this addition period increased from room temperature to 52° C. Water was added at a faster rate over an 11 minute period until enough was present to hydrolyze all the acetoxy groups. The total amount of water added was 60 g. To the resulting mixture, 150 g. of toluene and 140 g. of water was added and the mixture was stirred for 25 minutes. An additional 50 g. of toluene was then added and a product layer and an aqueous layer formed. The aqueous layer was separated from the product layer and the product layer was washed three times with hot water. The washed product was azeotroped to 113° C. to remove any remaining water. The resulting product was a modified hydroxylated monomethylsiloxane-diphenylsiloxane copolymer having 29.5 mol percent diphenylsiloxane units and 70.5 mol percent monomethylsiloxane units based on the total number of diphenylsiloxane units and monomethylsiloxane units and 7.3 weight percent silicon-bonded hydroxyl radicals. The modified hydroxylated monomethylsiloxane-diphenylsiloxane copolymer was 30 weight percent

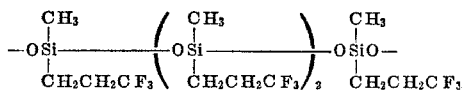

The modified hydroxylated monomethylsiloxane-diphenylsiloxane copolymer gelled in two minutes when heated at 250° C. and cured to a film of F-H pencil hardness when catalyzed with ferric octoate and heated for 10 minutes at 232° C.

EXAMPLE 4

To 220 g. (1.0 mole) of methyltriacetoxysilane, 9.0 g. (0.5 mole) of water was added dropwise with agitation over a 10 minute period. The temperature increased from 26° C. to 60° C. during the addition. The agitation was continued for an additional 10 minutes. To the resulting product, 54 g. (0.25 mole) of diphenylsilanediol was added over a 2 minute period. Agitation was continued during the addition and for 40 minutes thereafter. The temperature increased from 42° C. to 50° C. during the addition. The resulting product was vacuum stripped to 95° C. at 17 mm. of Hg whereby 92.52 g. of acetic acid was recovered (theoretical 90 g.). To the stripped product at 91° C., 27 g. (0.125 mole) of diphenylsilanediol was added and the mixture was agitated for 30 minutes. The resulting product was vacuum stripped to 95° C. at 17 mm. of Hg whereby 10.48 g. of acetic acid was recovered (theoretical 12.48 g.). The product was an acetoxymonomethylsiloxane-diphenylsiloxane copolymer having 27.25 mol percent diphenylsiloxane units and 72.75 mol percent monomethylsiloxane units wherein the acetoxy groups are bonded to the silicon atoms of the monomethylsiloxane units. The acetoxymonomethylsiloxane-diphenylsiloxane copolymer was 35.1 weight percent acetoxy (theoretical 36.9 weight percent).

To 200 g. of water, 140 g. of the above acetoxymonomethylsiloxane-diphenylsiloxane copolymer in 200 g. of toluene was added. The mixture was stirred for 30 minutes and then allowed to stand whereby an aqueous layer and a product layer formed. The aqueous layer was removed and the product layer was washed four times with hot water. The washed product layer was azeotroped to remove any remaining water. The product was a hydroxylated monomethylsiloxane-diphenylsiloxane copolymer having 27.25 mol percent diphenylsiloxane units and 72.75 mol percent monomethylsiloxane units having a weight loss of 2.8 percent after 3 hours, 3.2 percent after 24 hours and 3.5 percent after 100 hours. A film of the hydroxylated monomethylsiloxane-diphenylsiloxane copolymer had a pencil hardness of H after heating for 1 hour at 232° C. The hydroxylated monomethylsiloxane-diphenylsiloxane copolymer gelled in 3 minutes when heated at 250° C. The above toluene solution of the hydroxylated monomethylsiloxane-diphenylsiloxane copolymer remained unchanged after shelf aging over 7 months.

EXAMPLE 5

To 660 g. (3 moles of methyltriacetoxysilane, 324 g. (1.5 moles) of diphenylsilanediol was added. The temperature during the addition increased from 25° C. to 67° C. The mixture was stirred for 35 minutes, cooled to 31° C. and then 162 g. (0.75 mole) of diphenylsilanediol was added. This mixture was stirred for 35 minutes and then vacuum stripped to 120° C. at 11 mm. of Hg. The product was an acetoxymonomethylsiloxane-diphenylsiloxane copolymer having 57 mol percent monomethylsiloxane units and 43 mol percent diphenylsiloxane units.

To the above acetoxymonomethylsiloxane-diphenylsiloxane copolymer, 669 g. of xylene was added. The xylene-copolymer solution was then added to 2400 cc. of water. This mixture was stirred one hour resulting in an emulsion. The emulsified mixture was refluxed for 2.75 hours at 93° C. whereby an emulsion layer and a product layer formed. The product layer was separated from the emulsion layer. To the aqueous emulsion layer, 400 g. of xylene was added. Separated aqueous layer from xylene layer, combined the product layer and the xylene layer and then washed the product three times with water. The product was then azeotroped and concentrated to 160° C. removing most of the xylene. To the highly viscous product, 180 cc. of toluene was added. The product was a hydroxylated monomethylsiloxane-diphenylsiloxane copolymer having 57 mol percent monomethylsiloxane units and 43 mol percent diphenylsiloxane units. The hydroxylated monomethylsiloxane-diphenylsiloxane copolymer gelled in 1.5 minutes when heated to 250° C.

The hydroxylated monomethylsiloxane-diphenylsiloxane copolymer was heated for 15.5 hours at 142° C. whereby 7.0 cc. of water was collected. To the hydroxylated monomethylsiloxane-diphenylsiloxane copolymer, 2.55 g. of zinc octoate was added (equivalent to 0.05 weight percent zinc) and the hydroxylated monomethylsiloxane-diphenylsiloxane copolymer was heated for an additional 7 hours whereby the total water trapped was 9.8 cc. The resulting hydroxylated monomethylsiloxane-diphenylsiloxane copolymer was diluted to 50 weight percent solids with xylene. The hydroxylated monomethylsiloxane-diphenylsiloxane copolymer had 0.4 weight percent silicon-bonded hydroxyl radicals bonded to the monomethylsiloxane units and the 50 weight percent xylene solution had a viscosity of 256.1 cs. at 25° C. The hydroxylated monomethylsiloxane-diphenylsiloxane copolymer had a weight loss of 3.05 percent after 3 hours. The hydroxylated monomethylsiloxane - diphenylsiloxane copolymer gelled in 2 minutes when heated at 250° C. The hydroxylated monomethylsiloxane - diphenylsiloxane copolymer had a pencil hardness of H when heated at 232° C. for 45 minutes.

EXAMPLE 6

To 660 g. (3 moles) of methyltriacetoxysilane, 324 g. (1.5 moles) of diphenylsilanediol was added over a 4 minute period whereby the temperature increased from 25° C. to 65° C. The mixture was stirred for 45 minutes. The resulting product was an acetoxymonomethylsiloxane-diphenylsiloxane copolymer as described in Example 1.

The acetoxymonomethylsiloxane-diphenylsiloxane copolymer was dissolved in 747 g. of xylene and this solution was added to 240 cc. of hot water over a 2 minute period. The resulting mixture was then stirred for one hour, the product layer separated from the aqueous layer, washed three times with hot water and then azeotroped to 145° C. to remove any remaining water and 348 g. of xylene. The resulting product was a hydroxylated monomethylsiloxane-diphenylsiloxane copolymer having 33.3 mol percent diphenylsiloxane units and 66.7 mol percent monomethylsiloxane units and a viscosity of 8.9 cs. at 25° C. at 50 weight percent solids. The hydroxylated monomethylsiloxane diphenylsiloxane copolymer gelled in 1 minute when heated at 250° C.

To 308 g. of the above xylene solution of the hydroxylated monomethylsiloxane-diphenylsiloxane copolymer, zinc octoate was added to provide 0.05 weight percent zinc based on the weight of the copolymer. This mixture was heated for 6 hours at 143° C. whereby 6 cc. of water was collected. The resulting product was a hydroxylated monomethylsiloxane-diphenylsiloxane copolymer having 33.3 mol percent diphenylsiloxane units and 66.7 mol percent monomethylsiloxane units a weight loss of 1.9 percent after 3 hours, gelled in two minutes when heated at 250° C. and a viscosity of 30.4 cs. at 25° C. and 50 weight percent solids.

EXAMPLE 7

(A) To 440 g. (2 moles) of methyltriacetoxysilane, 18 g. of water was added dropwise over a 16 minute period during which time the temperature increased from 25° C. to 40° C. The mixture was stirred for 3 minutes and then 108 g. (0.5 mole) of diphenylsilanediol was added. This mixture was stirred one hour and then 54 g. of diphenylsilanediol was added. The mixture was stirred for 20 minutes and an additional 27 g. of diphenylsilanediol was added. The resulting mixture was stirred for 30 minutes before adding 13.5 g. of diphenylsilanediol and the stirring was continued for 23 minutes. The resulting mixture was then vacuum stripped to 125° C. at 10 mm. of Hg whereby an acetoxymonomethylsiloxane-diphenylsiloxane copolymer having 68 mol percent monomethylsiloxane units and 32 mol percent diphenylsiloxane units was obtained.

(B) A mixture of 300 g. of the above acetoxymonomethylsiloxane-diphenylsiloxane copolymer, 4.5 g. of a monomethyldiacetoxysiloxy endblocked polydimethylsiloxane having an average of 36 dimethylsiloxane units per molecule, and 342 g. of xylene was added to 360 g. of water. The temperature upon the addition to the water increased from 25° C. to 32° C. The mixture was stirred for 20 minutes and then heated to 93° C. for 45 minutes. The resulting mixture was allowed to stand until aqueous layer and a product layer formed. The aqueous layer was separated from the product layer and discarded. The product layer was washed three times with hot water and then azeotroped to 136° C. to remove any remaining water. The resulting product was a modified hydroxylated monomethylsiloxane-diphenylsiloxane copolymer having 68 mol percent monomethylsiloxane units and 32 mol percent diphenylsiloxane units based on the total number of monomethylsiloxane units and diphenylsiloxane units and 2 weight percent polydimethylsiloxane segments having an average of 36 dimethylsiloxane units per molecule.

(C) To the above modified hydroxylated monomethylsiloxane-diphenylsiloxane copolymer, 2.85 g. of zinc octoate was added and the resulting mixture was then heated to 140° C. for two hours. Thereafter 240 g. of solvent was removed to concentrate the product and heating was continued at 145° C. for 35 minutes. The very viscous product was diluted by adding 85 g. of xylene. The resulting product was a modified hydroxylated monomethylsiloxane-diphenylsiloxane copolymer as described above with a viscosity of 159 cs. at 25° C., a weight loss of 1.5 percent after 3 hours and a gel time of 1.75 minutes when heated at 250° C.

EXAMPLE 8

(A) To 880 g. (4 moles) of methyltriacetoxysilane at 40° C., 36 g. of water was added dropwise over a 30 minute period and then stirred for an additional 10 minutes before adding 216 g. (1 mole) of diphenylsilanediol. The addition time for the diphenylsilanediol was 1 minute and the mixture after the addition was stirred for 30 minutes, thereafter 108 g. (0.5 mole) of diphenylsilanediol was added. The resulting mixture was stirred for 2 hours. The resulting product was an acetoxymonomethylsiloxane-diphenylsiloxane copolymer having 73 mol percent monomethylsiloxane units and 27 mol percent diphenylsiloxane units.

(B) A mixture of 620 g. of the product prepared above in (A), 11.3 g. of the monomethyldiacetoxysiloxy endblocked polydimethylsiloxane described in Example 7 and 423 g. of xylene was added to 1440 g. of water. The temperature increased during the addition from 28° C. to 32° C. and then the mixture was heated to 90° C. for two hours and then refluxed for an additional hour. The aqueous layer was separated from the product layer and the product layer was washed three times with hot water. The washed product was azeotroped to remove any remaining water and concentrated by heating to 142° C. and removing 200 g. of xylene. To this product, 1.76 g. of zinc octoate was added and then heated for 2 hours at reflux. The resulting product was a modified hydroxylated monomethylsiloxane-diphenylsiloxane copolymer having 73 mol percent monomethylsiloxane units and 27 mol percent diphenylsiloxane units based on the total number of monomethylsiloxane units and diphenylsiloxane units, 4.0 weight percent polydimethylsiloxane segments and a weight loss of 2.05 percent after 3 hours.

(C) A mixture of 620 g. of the product prepared above in (A), 22.6 g. of the monomethyldiacetoxysiloxy end-blocked polydimethylsiloxane described in Example 7 and 423 g. of xylene was added to 1440 g. of water. The temperature increased to 32° C. during the addition and then the mixture was heated to reflux over a two hour period. The aqueous layer and product layer were separated and the product layer was washed three times with hot water. The resulting washed product was azeotroped to 145° C. to remove any remaining water and 200 g. of xylene was removed. The resulting product was a modified hydroxylated monomethylsiloxanediphenylsiloxane copolymer having 73 mol percent monomethylsiloxane units and 27 mol percent diphenylsiloxane units based on the total number of monomethylsiloxane units and diphenylsiloxane units and 8.0 weight percent polydimethylsiloxane segments. To this modified hydroxylated monomethylsiloxane-diphenylsiloxane copolymer, 1.76 g. of zinc octoate and 50 g. of xylene were added and the mixture was then refluxed for 75 minutes. The resulting product was very viscous and was diluted with 200 g. of xylene. The resulting product was a modified hydroxylated monomethylsiloxanediphenylsiloxane copolymer as defined above having a viscosity of 156.8 cs. at 25° C. and 40 percent solids in xylene, a weight loss of 1.7 percent after 3 hours and a gel time of 2 minutes when heated at 250° C.

EXAMPLE 9

A mixture of 18 g. of water and 162 g. of tetrahydrofuran was added dropwise to 440 g. (2 moles) of methyltriacetoxysilane over a 75 minute period. To this mixture, 108 g. (0.5 mole) of diphenylsilanediol was added and thereafter the mixture was stirred for 80 minutes. To this mixture 28 g. of a monomethyldiacetoxysiloxy endblocked polydimethylsiloxane having an average of 47 dimethylsiloxane units per molecule was added, followed by 392 g. of xylene. This mixture was then added to water of an amount in excesses of that necessary to hydrolyze all the acetoxy groups. The mixture was stirred for 2 hours and heated to 82° C. during an additional hour of stirring. The product phase was recovered and washed as described in Example 6. The resulting washed product layer was then azeotroped to 140° C. to remove any remaining water and 175 cc. of solvent. The resulting product was refluxed for 40 minutes at 140° C. and then concentrated by heating to 145° C. and removing 104 g. of solvent. The concentrated product was refluxed for 30 minutes more and then 204 g. of xylene was added to reduce the highly viscous product. The resulting product was a modified hydroxylated monomethylsiloxane-diphenylsiloxane copolymer having 80 mol percent monomethylsiloxane units and 20 mol percent diphenylsiloxane units, 12 weight percent of polydimethylsiloxane segments, 4.4 weight percent silicon-bonded hydroxyl radicals bonded to the monomethylsiloxane units based on the total weight of the modified hydroxylated monomethylsiloxane-diphenylsiloxane copolyer, a viscosity of 94 cs. at 25° C. and 40 percent solids, a weight loss of 2.25 percent after 3 hours, and a gel time of 1.5 minutes when heated at 250° C.

EXAMPLE 10

To 660 g. (3 moles) of methyltriacetoxysilane, 324 g. (1.5 mole) of diphenylsilanediol was added during a three minute period. The mixture was stirred for 30 minutes and then 125 g.

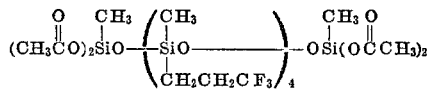

prepared in Example 2 was added to the mixture at 40° C. and thereafter stirred for 5 minutes. Cold water was added dropwise to the resulting mixture over a 20 minute period. The water was then added dropwise at a faster rate over a 7 minute period until a total of 100 cc. had been added, and then 2000 cc. of hot water was added, the mixture stirred for one minute and 886 g. of xylene was added. The resulting mixture was stirred for 30 minutes at about 60° C. The product layer was recovered and washed with hot water four times as described in Example 6. The resulting washed product layer was azeotroped to remove any remaining water and concentrated by heating to 142° C. and removing 300 g. of xylene. The resulting product was then heated at reflux for 1.5 hours and then zinc octoate was added to provide 0.05 weight percent zinc based on the total weight of the modified hydroxylated monomethylsiloxane-diphenylsiloxane copolymer. The resulting mixture was heated at reflux for one hour. The resulting product was a modified hydroxylated monomethylsiloxane-diphenylsiloxane copolymer having 68.5 mol percent monomethylsiloxane units and 31.5 mol percent diphenylsiloxane units based on the total number of monomethylsiloxane units and diphenylsiloxane units, 14 weight percent

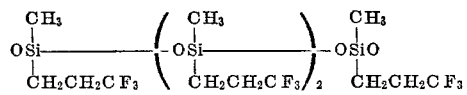

segments based on the total weight of the modified hydroxylated monomethylsiloxane-diphenylsiloxane copolymer, 2.5 weight percent silicon-bonded hydroxyl radicals which are bonded to the silicon atoms of the monomethylsiloxane units based on the total weight of the modified hydroxylated monomethylsiloxane-diphenylsiloxane copolymer, a viscosity of 62 cs. at 25° C. at 50 weight percent solids, a weight loss of 2.4 percent after 3 hours and a gel time of 1 minute when heated at 250° C.

EXAMPLE 11

To 660 g. (3 moles) of methyltriacetoxysilane, 324 g. (1.5 moles) of diphenylsilanediol was added during which the temperature increased from 24° C. to 64° C. The resulting mixture was stirred 20 minutes and then 162 g. (0.75 mole) of diphenylsilanediol was added. The resulting solution was stirred for 35 minutes and 60 g. of toluene and 12.9 g. of a hydroxyl endblocked polydimethylsiloxane having an average of 36 dimethylsiloxane units per molecule was added. This mixture was stirred for 12 minutes before adding 81 g. of water. The mixture was stirred 45 minutes and then vacuum stripped to 150° C. at 15 mm. of Hg. The resulting product was diluted with 300 g. of toluene and 100 cc. of water, and thereafter stirred for one hour before vacuum stripping to 130° C. at 24 mm. of Hg. To the resulting product 4 g. of zinc octoate was added and refluxing was continued for 32 hours. The resulting product was a modified hydroxylated monomethylsiloxane-diphenylsiloxane copolymer having 43 mol percent diphenylsiloxane units and 57 mol percent monomethylsiloxane units based on the total number of monomethylsiloxane units and diphenylsiloxane units, 2 weight percent polydimethylsiloxane segments based on the total weight of the modified copolymer, 1.5 weight percent silicon-bonded hydroxyl radicals which are bonded to the silicon atoms of the monomethylsiloxane units based on the total weight of the modified hydroxylated monomethylsiloxane-diphenylsiloxane copolymer, a viscosity of 75 cs. at 25° C. and 57 percent solids, a weight loss of 3.5 percent after 3 hours, and a gel time of 6 minutes when heated at 250° C.

EXAMPLE 12

(A) To 660 g. (3 moles) of methyltriacetoxysilane, 324 g. (1.5 moles) of diphenylsilanediol was added. The mixture was stirred for one hour before 162 g. (0.75 mole) of diphenylsilanediol was added at 40° C. The resulting mixture was stirred for 50 minutes before vacuum stripping the mixture to 128° C. at 10 mm. of Hg. A mixture of 40 g. of toluene, 12.9 g. of the hydroxyl endblocked polydimethylsiloxane described in Example 11, and 32.3 g. of a hydroxyl endblocked polyphenylmethylsiloxane having an average of 13 phenylmethylsiloxane units per molecule was added and then stirred for 18 minutes. To the resulting mixture a portion of 81 g. of water was added dropwise over a 7 minute period at which time the temperature increased to 73° C., and then the remainder of the water was added. The resulting product was then stirred 40 minutes before vacuum stripping to 142° C. at 12 mm. of Hg. To the product, 292 g. of xylene was added. The resulting product was a modified hydroxylated monomethylsiloxane-diphenylsiloxane copolymer having 43 mole percent diphenylsiloxane units and 57 mol percent monomethylsiloxane units based on the total number of monomethylsiloxane units and diphenylsiloxane units, 5.0 weight percent polyphenylmethylsiloxane segments based on the total weight of the modified copolymer, 2.0 weight percent polydimethylsiloxane segments based on the total weight of the modified copolymer, 4.3 weight percent silicon-bonded hydroxyl radicals which are bonded to the silicon atoms of the monomethylsiloxane units based on the total weight of the modified copolymer, and a viscosity of 115 cs. at 25° C. and 70 weight percent solids. A cured film of a catalyzed modified hydroxylated monomethylsiloxane-diphenylsiloxane copolymer defined above had a pencil hardness of H at room temperature and at 149° C. and good release properties.

(B) To 520 g. of the above modified hydroxylated monomethylsiloxane-diphenylsiloxane copolymer, 370 g. of xylene was added before washing the modified hydroxylated monomethylsiloxane-diphenylsiloxane copolymer once with hot water. The aqueous layer and the copolymer layer were separated and the copolymer layer was then azeotroped to remove any remaining water, refluxed for 2.5 hours and then concentrated by removing 247 g. of xylene. To the resulting product, 2.3 g. of zinc octoate was added and thereafter the mixture was refluxed at 142° C. for 18 hours. The resulting product was the modified hydroxylated monomethylsiloxane-diphenylsiloxane copolymer described above, having 0.5 weight percent silicon-bonded hydroxyl radicals which are bonded to the silicon atoms of the monomethylsiloxane units, a viscosity of 163 cs. at 25° C. and 56 weight percent solids, a weight loss of 3.9 weight percent after 3 hours, and a gel time of 2.7 minutes when heated to 250° C.

A film of the modified hydroxylated monomethylsiloxane-diphenylsiloxane copolymer catalyzed with 0.05 weight percent iron as iron octoate, cured to a pencil hardness of 2H after 1 hour at 232° C.

EXAMPLE 13

To 715 g. (3.25 moles) of methyltriacetoxysilane, 29.2 g. of water was added over a 3 minute period during which time the temperature inreased from 26° C to 68° C. To this mixture, 378 g. (1.75 moles) of diphenylsilanediol was added and the mixture was stirred for 45 minutes before 11.3 g. of a hydroxyl endblocked polydimethylsiloxane as described in Example 11 in 11.3 g. of toluene was added. The resulting mixture was stirred for two hours before adding 54 g. of water over an 8 minute period during which time the temperature inreased from 32° C. to 48° C. This mixture was stirred 1.5 hours before vacuum stripping to 115° C. at 20 mm. of Hg. The resulting product was diluted with 894 g. of xylene and was a modified hydroxylated monomethylsiloxane-diphenylsiloxane copolymer having 65 mol percent monomethylsiloxane units and 35 mol percent diphenylsiloxane units based on the total number of monomethylsiloxane units and diphenylsiloxane units, 2.0 weight percent polydimethylsiloxane segments based on the total weight of the modified copolymer, a viscosity of 4.7 cs. at 25° C. and 40 weight percent solids, 9.5 weight percent silicon-bonded hydroxyl radicals which are bonded to the silicon atoms of the monomethylsiloxane units based on the total weight of the modified copolymer and a gel time of 2 minutes when heated at 250° C.

EXAMPLE 14

A flask equipped with a stirrer and a thermometer was charged with 586 g. (2.66 moles) of methyltriacetoxysilane and agitation was started prior to the addition of 290 g. of diphenylsilanediol. The addition time of the diphenylsilanediol was less than 1 minute. The temperature of the mixture increased from 25° C. to 76° C. from the exothermic reaction. The agitation was continued for 2 hours and then the product was vacuum stripped to 78° C. at 22 mm. of Hg. After the product was stripped additional 145 g. (0.67 mole) of diphenylsilanediol was added. The mixture was then agitated for 30 minutes. The reaction product was then vacuum stripped to 74° C. at 23 mm. of Hg. The product was clear and contained 32.5 weight percent acetoxy groups and no detectable ≡SiOH. The product was an acetoxymonomethylsiloxane-diphenylsiloxane copolymer of 57 mol percent monomethylsiloxane units and 43 mol percent diphenylsiloxane units with the acetoxy groups attached to the silicon atoms of the monomethylsiloxane units. A coating of the acetoxymonomethylsiloxane-diphenylsiloxane copolymer remained soft and tacky and did not cure after being exposed to the atmosphere for 4 days at room temperature. The coating required two weeks to form a skin on the surface, but cured to a hard film when heated to 227° C. for 10 minutes.

A solution of the acetoxymonomethylsiloxane-diphenylsiloxane copolymer was made by blending 600 g. of the acetoxymonomethylsiloxane - diphenylsiloxane copolymer with 900 g. of toluene. The resulting solution was added to 1500 g. of water. After agitating the resulting mixture for 30 minutes at about 48° C., the aqueous layer containing acetic acid was separated from the monomethylsiloxane-diphenylsiloxane copolymer layer by decanting. The monomethylsiloxane-diphenylsiloxane copolymer layer was then washed three times with hot water and the wash water was removed by decanting and the monomethylsiloxane-diphenylsiloxane copolymer layer was azeotroped to remove the residual water. The resulting product was a hydroxylated monomethylsiloxane-diphenylsiloxane copolymer having 57 mol percent monomethylsiloxane units and 43 mol percent diphenylsiloxane units, 5.7 weight percent silicon-bonded hydroxyl radicals which are bonded to the monomethylsiloxane units based on the total weight of the copolymer, and a gel time of 7 minutes when heated at 250° C. The hydroxylated monomethylsiloxane-diphenylsiloxane copolymer cured to a clear hard film when catalyzed with 0.05 weight percent iron added as iron octoate.

EXAMPLE 15

To 290 g. (1.34 moles) of diphenylsilanediol, 586 g. (2.66 moles) of methyltriacetoxysilane was added while agitating the diphenylsilanediol. The mixture increased in temperatures from 25° C. to 74° C. during the addition. The mixture was agitated for 2 hours and then vacuum stripped to 75° C. at 24 mm. of Hg. The product was a clear liquid.

An additional 145 g. (0.67 mole) of diphenylsilanediol was then added to the above product and agitation was continued for 15 minutes. A clear product resulted after vacuum stripping to 75° C. at 22 mm. of Hg. To the resulting product, an additional 72.5 g. (0.335 mole) of diphenylsilanediol was added and the mixture was then agitated for 15 minutes. After vacuum stripping to 72° C. at 24 mm. of Hg, a clear product resulted which was an acetoxymonomethylsiloxane - diphenylsiloxane copolymer containing 46.8 mol percent diphenylsiloxane units and 53.2 mol percent monomethylsiloxane units having 27.5 weight percent acetoxy groups bonded to the silicon atoms of the monomethylsiloxane units. There was no detectable silicon bonded hydroxyl groups in the acetoxymonomethylsiloxane-diphenylsiloxane copolymer.

A mixture of 600 g. of the above acetoxymonomethylsiloxane-diphenylsiloxane copolymer and 900 g. of toluene was added to 1500 g. of water and the hydrolysis as described in Example 14 was carried out. The resulting product was a hydroxylated monomethylsiloxane-diphenylsiloxane copolymer having 53.2 mol percent monomethylsiloxane units and 46.8 mol percent diphenylsiloxane units with 4.26 weight percent silicon-bonded hydroxyl radicals which are bonded to the monomethylsiloxane units based on the total weight of the hydroxylated monomethylsiloxane-diphenylsiloxane copolymer.

EXAMPLE 16

Added 27 g. of water dropwise to 660 g. (3 moles) of methyltriacetoxysilane over an 11 minute period during which time the temperature increased from 25° C. to 82° C. The resulting mixture was stirred for 17 minutes before adding 162 g. (0.75 mole) of diphenylsilanediol at 65° C. in one minute's time during which the temperature increased to 72° C. This mixture was stirred for 15 minutes before vacuum stripping for 40 minutes to 75° C. at 14 mm. of Hg. To the resulting product, 81 g. (0.375 mole) of diphenylsilanediol was added in one minute's time during which the temperature increased from 75° C. to 85° C. The mixture was stirred for 15 minutes and then vacuum stripped for 30 minutes to 85° C. at 12 mm. of Hg. The resulting product was an acetoxymonomethylsiloxane-diphenylsiloxane copolymer having 27.3 mol percent diphenylsiloxane units and 72.7 mol percent monomethylsiloxane units.

The above acetoxymonomethylsiloxane-diphenylsiloxane copolymer in 300 g. of toluene was added to 2000 g. of water over a 10 minute period. The mixture was stirred for 30 minutes and then 400 g. of toluene was added. The aqueous phase was separated from the product phase and the product phase was washed twice with hot water. The resulting washed product was azeotroped to remove any remaining water. The resulting product was a hydroxylated monomethylsiloxane - diphenylsiloxane copolymer having 27.3 mol percent diphenylsiloxane units and 72.7 mol percent monomethylsiloxane units, 9.7 weight percent silicon-bonded hydroxyl radicals which are bonded to the monomethylsiloxane units, a weight loss of 3.85 percent after 3 hours, and a gel time of 2.3 minutes when heated at 250° C.

EXAMPLE 17

Using the procedure of Example 16, 162 g. of diphenylsilanediol instead of 243 g., and 400 g. of toluene instead of 700 g., a hydroxylated monomethylsiloxane-diphenylsiloxane copolymer having 80 mol percent monomethylsiloxane units and 20 mol percent diphenylsiloxane units, 10 weight percent silicon-bonded hydroxyl radicals which were bonded to the monomethylsiloxane units, a weight loss of 5.9 weight percent after 3 hours, and a gel time of 2.8 minutes when heated at 250° C. was obtained.

EXAMPLE 18

To 880 g. (4.0 moles) of methyltriacetoxysilane, 36 g. of water was added dropwise over a six minute period during which time the temperature increased from 26° C. to 79° C. The mixture was allowed to agitate for 30 minutes before 216 g. (1.0 mole) of diphenylsilanediol was added over a three minute period during which time the temperature increased from 35° C. to 42° C. The mixture was agitated for 35 minutes and then 108 g. (0.5 mole) of diphenylsilanediol was added over a minute period. The mixture was agitated for 50 minutes before adding 828 g. of toluene. To the resulting mixture, 80 g. of water was added dropwise over a 10 minute period and then 1520 g. of water was added. The temperture of the water added was 56° C. The mixture was heated to 84° C. over a 40 minute period, then 400 g. of water was added and the mixture was allowed to stand overnight. The aqueous phase and the product phase were separated and the product phase was washed with hot water. The resulting product was a hydroxylated monomethylsiloxane-diphenylsiloxane copolymer having 73 mol percent monomethylsiloxane units and 27 mol percent diphenylsiloxane units, 6.96 weight percent silicon-bonded hydroxyl radicals which are bonded to the monomethylsiloxane units based on the total weight of the hydroxylated monomethylsiloxane-diphenylsiloxane copolymer, a weight loss of 1.85 percent after 3 hours, and a gel time of 1.5 minutes when heated at 250° C.

158 g. of the above hydroxylated monomethylsiloxane-diphenylsiloxane copolymer solution was heated at reflux for 7 hours. The resulting product was a hydroxylated monomethylsiloxane-diphenylsiloxane copolymer as described above except the percentage of the silicon-bonded hydroxyl radicals was reduced to 6.00 weight percent, the weight loss was 1.55 weight percent after 3 hours and the gel time was 1.25 minutes when heated at 250° C.

158 g. of the above hydroxylated monomethylsiloxane-diphenylsiloxane compolymer solution and 1.25 g. of zinc octoate was heated at reflux for 7 hours. The resulting product was a hydroxylated monomethylsiloxane-diphenylsiloxane copolymer as described above except the percentage of silicon-bonded hydroxyl radicals was reduced to 1.92 weight percent, the weight loss was 1.90 weight percent after 3 hours and the gel time was 1.12 minutes when heated at 250° C.

EXAMPLE 19

To 660 g. (3.0 moles) of methyltriacetoxysilane, 324 g. (1.5 moles) of diphenylsilanediol was added over a 2 minute period during which time the temperature increased from 25° C. to 65° C. The mixture was cooled to 41° C. and stirred for 25 minutes before adding 162 g. (0.75 mole) of diphenylsilanediol over a one minute period. The mixture was stirred for 25 minutes before vacuum stripping to 108° C. at 14 mm. Hg. To the resulting mixture, 12.9 g. of a hydroxyl endblocked polydimethylsiloxane having an average of 47 dimethylsiloxane units per molecule was added, stirred for 30 minutes and then 160 g. of toluene was added. To the resulting mixture, 72 g. of water was added over a 10 minute period during which time the temperature increased from 30° C. to 54° C. The product mixture was then vacuum stripped to 112° C. at 25 mm. of Hg and 692 g. of xylene was added to the residue. The residue was a modified hydroxylated monomethylsiloxane-diphenylsiloxane copolymer having 43 mol percent diphenylsiloxane units and 57 mol percent monomethylsiloxane units, 5.94 weight percent silicon-bonded hydroxy radicals which were bonded to the monomethylsiloxane units, 1.17 weight percent acetate groups based on the total weight of the modified hydroxylated monomethylsiloxane-diphenylsiloxane copolymer, 2 weight percent polydimethylsiloxane segments based on the total weight of the modified copolymer, a weight loss of 7.7 weight percent after 3 hours, a gel time of 7 minutes when heated at 250° C. and a viscosity of 10.9 cs. at 25° C. and 50 weight percent solids. A cured film of the modified hydroxylated monomethylsiloxane-diphenylsiloxane copolymer catalyzed with 0.05 weight percent iron added as ferric octoate based on the total weight of the modified copolymer had a pencil hardness of H both at room temperature and at 149° C. and had good release properties.

EXAMPLE 20

To 440 g. (2.0 moles) of methyltriacetoxysilane, 18 g. of water was added dropwise over a 5 minute period during which time the temperature increased to 83° C. The mixture was cooled to 41° C. and stirred for 25 minutes before adding 108 g. of diphenylsilanediol over a one minute period during which the temperature increased from 30° C. to 40° C. The resulting mixture was stirred 35 minutes before addiing 54 g. of diphenylsilanediol over a one minute period. The mixture was stirred for 30 minutes before adding 5.65 g. of a monomethyldiacetoxysiloxy endblocked polydimethylsiloxane having an average of 36 dimethylsiloxane units per molecule in 5.65 g. of xylene. To this mixture, 69.6 g. of a monomethyldiacetoxysiloxy endblocked polyphenylmethylsiloxane having an average of 13 phenylmethylsiloxane units per molecule in 104.4 g. of xylene was added. To this reaction mixture, 413 g. of xylene was added before adding the mixture to 1440 g. of water over a 10 minute period during which time the temperature increased from 31° C. to 36° C. The agitated mixture was then heated to 70° C. during one hour's time and then heated another hour between 70° C. and 66° C. The resulting product layer which formed was separated from the aqueous layer and then washed with hot water. The product layer was azeotroped to remove any remaining water and 176 g. of xylene was removed. The resulting product was a modified hydroxylated monomethylsiloxane-diphenylsiloxane copolymer having 26.6 mol percent diphenylsiloxane units and 73.4 mol percent monomethylsiloxane units based on the total number of moles of diphenylsiloxane units and monomethylsiloxane units, 1.4 weight percent polydimethylsiloxane segments based on the total weight of the modified copolymer, 16.8 weight percent polyphenylmethylsiloxane segments based on the total weight of the modified copolymer, 4.58 weight percent silicon-bonded hydroxyl radicals which are bonded to the monomethylsiloxane units based on the total weight of the modified copolymer and 0.05 weight percent acetate groups based on the total weight of the modified copolymer.

EXAMPLE 21

(A) To 583 g. (2.65 moles) of methyltriacetoxysilane, 24 g. of water was added dropwise over a 5 minute period during which time the temperature increased from 26° C. to 82° C. The resulting mixture was stirred for 10 minutes and cooled to 20° C. before 356 g. (1.65 moles) of diphenylsilanediol was added over a one minute period during which time the temperature increased from 20° C. to 30° C. The resulting mixture was stirred for 30 minutes before adding a mixture of 68 g. of xylene and 68.0 g. of a hydroxyl endblocked polyphenylmethylsiloxane having an average of 12 phenylmethylsiloxane units per molecule. This mixture was stirred for 30 minutes before adding a mixture of 15.2 g. of toluene and 15.2 g. of a monomethyldiacetoxysiloxy endblocked polydimethylsiloxane having an average of 63 dimethylsiloxane units per molecule. To this mixture, 812 g. of xylene was added and the mixture was then stirred for 10 minutes before adding the mixture to 2000 g. of water over a two minute period during which time the temperature increased from 27° C. to 30° C. The resulting mixture was heated over a 40 minute period to 60° C. and then over a one hour period to 71° C. The resulting aqueous phase and product phase was formed were separated and the product phase was then washed with hot water. The washed product phase was azeotroped to remove any remaining water and 294 g. of xylene was removed. The resulting product was a modified hydroxylated monomethylsiloxane-diphenylsiloxane copolymer having 38.4 mol percent diphenylsiloxane units and 61.6 mol percent monomethylsiloxane units based on the total number of diphenylsiloxane units and monomethylsiloxane units, 3.0 weight percent polydimethylsiloxane segments based on the total weight of the modified copolymer, 13.5 weight percent polyphenylmethylsiloxane segments based on the total weight of the modified copolymer, 6.97 weight percent silicon-bonded hydroxyl radicals which are bonded to the monomethylsiloxane units based on the total weight of the modified copolymer, a weight loss of 4.1 weight percent after 3 hours, a gel time of 2.3 minutes when heated at 250° C. and a viscosity of 7.7 cs. at 25° C. and 48 weight percent solids.

(B) A mixture of 0.05 weight percent zinc based on the weight of the modified copolymer added as zinc octoate and 674 g. of the modified copolymer of (A) was heated for 10 hours at 145° C. The resulting modified hydroxylated monomethylsiloxane-diphenylsiloxane copolymer as described above had a weight loss of 3.6 weight percent after 3 hours, a gel time of 4 minutes when heated at 250° C. and a viscosity of 122.9 cs. at 25° C. and 62 weight percent solids.

EXAMPLE 22

To 605 g. (2.75 moles) of methyltriacetoxysilane, 378 g. (1.75 moles) of diphenylsilanediol was added over a one minutes period during which time the temperature increased from 26° C. to 65° C. The resulting mixture was stirred for 30 minutes before adding a mixture of 38.5 g. of xylene and 38.5 g. of a hydroxylated polydimethylsiloxane having an average of 8.5 dimethylsiloxane units per molecule. The resulting product was stirred for 30 minutes before vacuum stripping to 130° C. at 14 mm. of Hg whereby 254 g. of volatiles were collected. To the residue, 100 g. of xylene was added and 77 g. of water was added dropwise to this mixture over a 7 minute period during which time the temperature increased from 38° C. to 71° C. The resulting product was stirred for one hour before vacuum stripping to 130° C. at 16 mm. of Hg whereby 403 g. of volatiles were collected. The resulting product was a modified hydroxylated monomethylsiloxane-diphenylsiloxane copolymer having 38.9 mol percent diphenylsiloxane units and 61.1 mol percent monomethylsiloxane units based on the total number of monomethylsiloxane units and diphenylsiloxane units, 6.77 weight percent polydimethylsiloxane segments based on the total weight of the modified copolymer, 7.13 weight percent silicon-bonded hydroxyl radicals which are bonded to the monomethylsiloxane units based on the total weight of the modified copolymer, a weight loss of 7.5 weight percent after 3 hours, a gel time of 9 minutes when heated at 250° C. and a viscosity of 11.1 cs. at 25° C. and 50 weight percent solids.

EXAMPLE 23

To 1320 g. (6.0 moles) of methyltriacetoxysilane, 864 g. (4.0 moles) of diphenylsilanediol was added over a 3 minutes period. After stirring the above mixture for 30 minutes, 81 g. of water was added dropwise over a 4 minute period. The resulting product was stirred for 45 minutes before vacuum stripping to 142° C. at 20 mm. of Hg whereby 989 g. of volatiles were collected. The resulting product was diluted with 484 g. of xylene and was a hydroxylated monomethylsiloxane-diphenylsiloxane copolymer having 60 mol percent monomethylsiloxane units and 40 mol percent diphenylsiloxane units, 0.53 weight percent silicon-bonded hydroxyl radicals which are bonded to the monomethylsiloxane units based on the total weight of the hydroxylated copolymer, a weight loss of 3.45 percent after 3 hours, a gel time of 4.3 minutes when heated at 250° C., a viscosity of 150.3 cs. at 25° C. and 70 weight percent solids, and 4.5 weight percent acetate groups based on the total weight of the hydroxylated copolymer.

EXAMPLE 24

(A) To a mixture of 427 g. (2.85 moles) of methyltrichlorosilane and 374 g. of pyridine, 464 g. (2.15 moles) of diphenylsilanediol was added over a 9 minute period during which the temperature increased from 24° C. to 98° C. The flask containing the mixture of the methyltrichlorosilane and pyridine was cooled during the diphenylsilanediol addition by a cold water bath. The reaction mixture was stirred one hour before adding a mixture of 8.5 g. toluene and 8.5 g. of a hydroxyl endblocked polydimethylsiloxane as described in Example 11. This product mixture was stirred one hour before adding 929 g. of xylene.

The above product mixture was added to 2080 g. of water over an 8 minute period during which time the temperature increased from 27° C. to 46° C. The mixture was stirred for one hour before separating the aqueous phase from the product phase. The product phase fas washed twice with hot water. The resulting product was a modified hydroxylated monomethylsiloxane-diphenylsiloxane copolymer having 43 mol percent diphenylsiloxane units and 57 mol percent monomethylsiloxane units based on the total number of monomethylsiloxane units and diphenylsiloxane units, 2.0 weight percent polydimethylsiloxane segments based on the total weight of the modified copolymer, 5.1 weight percent silicon-bonded hydroxyl radicals which are bonded to the monomethylsiloxane units based on the total weight of the modified copolymer and a viscosity of 4.0 cs. at 25° C. and 40 weight percent solids.

(B) 600 g. of the modified copolymer of (A) was heated to reflux and 200 g. of xylene was removed before adding 1.5 g. of zinc octoate. Refluxing was continued for 9 hours and 40 minutes before adding 200 g. of xylene. The resulting product was a modified hydroxylated monomethylsiloxane-diphenylsiloxane copolymer as described above having 1.52 weight percent silicon-bonded hydroxyl radicals which are bonded to the monomethylsiloxane units based on the total weight of the modified copolymer, a weight loss of 3.45 percent after 3 hours, a gel time of 2 minutes when heated at 250° C. and a viscosity of 40.2 cs. at 25° C. and 40 weight percent solids.

EXAMPLE 25

To 990 g. of methyltriacteoxysilane, 972 g. of diphenylsilanediol was rapidly added during which the temperature increased to 61° C. The reaction mixture was agitated at 83° C. for 1.5 hours before vacuum stripping to 120° C. at about 40 mm. of Hg. The resulting product was an acetoxymonomethylsiloxane-diphenylsiloxane copolymer having 50 mol percent diphenylsiloxane units and 50 mol percent monomethylsiloxane units with 26.9 weight percent acetoxy groups bonded to the monomethylsiloxane units. To the acetoxymonomethylsiloxane-diphenylsiloxane copolymer, 1400 g. of dry toluene was added.

A mixture of 150 g. of the above solution of the acetoxymonomethylsiloxane - diphenylsiloxane copolymer and 6 g. of a hydroxyl endblocked polydimethylsiloxane having an average of 36 dimethylsiloxane units per molecule was heated to 64° C. and 0.66 g. of pyridine was added. The mixture was heated to 67° C., cooled to 25° C. and then heated to 72° C. To the reaction mixture, 165.0 g. of water was added and the agitated mixture was heated for one hour at 83° C. The aqueous layer and product layer which formed were separated and the product layer was washed with a 20 weight percent sodium chloride in water solution until the aqueous phase was neutral. The product phase was then azeotroped for 2.5 hours to remove any remaining water. The resulting product was a modified hydroxylated monomethylsiloxane-diphenylsiloxane copolymer having 50 mol percent diphenylsiloxane units and 50 mol percent monomethylsiloxane units based on the total number of diphenylsiloxane units and monomethylsiloxane units, 8.3 weight percent polydimethylsiloxane segments based on the total weight of the modified copolymer, 4.1 weight percent silicon-bonded hydroxyl radicals which are bonded to the monomethylsiloxane units based on the total weight of the modified copolymer, a weight loss of 1.5 percent after 3 htours, 2.5 percent after 24 hours and 3.9 percent after 100 hours, and a viscosity of 10.2 cs. at 25° C. and 53 weight percent solids.

EXAMPLE 26

This example is presented for purposes of comparison with prior art copolymers. A mixture of 253 g. of diphenyldichlorosilane, 356 g. of methyltriethoxysilane and 242 g. of dioxane was prepared. To this mixture, a mixture of 90 g. of water and 90 g. of dioxane was added dropwise over a 22 minute period during which time the temperature increased to 71° C. The reaction mixture was then stirred until the temperature reached 40° C. The organic layer was separated from the aqueous layer and the organic layer was then vacuum stripped to 106° C. at water aspirator pressure. The resulting product was clear, non-pourable at room temperature, but pourable at elevated temperatures. The resulting product was a copolymer of monomethylsiloxane and diphenylsiloxane units with a hydroxyl content of 1.19 weight percent. The resulting copolymer had a weight loss of 19.3 percent after 3 hours, and a gel time of more than 100 minutes when heated at 250° C. This copolymer was thermoplastic and did not cure when heated at 250° C.

EXAMPLE 27

(A) To a mixture of 20 g. of xylene and 660 g. of methyltriacetoxysilane, 324 g. of diphenylsilanediol was added over a three minute period during which time the temperature increased from 25° C. to 47° C. while the reaction vessel was cooled in a water bath. The reaction mixture was stirred 40 minutes before 162 g. of diphenylsilanediol was added. This reaction mixture was stirred for 10 minutes, the water bath was removed and then stirred 35 additional minutes before vacuum stripping to 130° C. at water aspirator pressure.

(B) The product of (A) was mixed with 968 g. of xylene and added to 1080 g. of water at 38° C. The resulting mixture was then heated at 80° C. for two hours. The product phase was recovered and washed as described in Example 6. The product phase was then azeotroped to remove any remaining water and 535 g. of xylene.

(C) To the product of (B), 4 g. of zinc octoate was added and the mixture was refluxed for 5 hours. The resulting product was a hydroxylated monomethylsiloxane-diphenylsiloxane copolymer having 57 mol percent monomethylsiloxane units and 43 mol percent diphenylsiloxane units and a weight loss of 4.4 percent after 3 hours at 250° C. and 8.1 percent after 100 hours at 300° C. The product was diluted with 314 g. of xylene.

(D) A mixture of 105 g. of the hydroxylated copolymer solution of (C), 0.8 g. of a monomethyldiacetoxysiloxy endblocked polydimethylsiloxane having an average of 45 dimethylsiloxane units per molecule in 0.8 g. xylene, 94 g. of xylene and 0.32 g. of ferric octoate was agitated for two hours at room temperature. The resulting product was a modified hydroxylated monomethylsiloxane-diphenylsiloxane copolymer having 57 mol percent monomethylsiloxane units and 43 mol percent diphenylsiloxane units based on the total number of the diphenylsiloxane units and monomethylsiloxane units and 1.45 weight percent polydimethylsiloxane segments based on the total weight of the modified copolymer. A cured film of the modified hydroxylated monomethylsiloxane-diphenylsiloxane copolymer was hard and exhibited good release properties.

EXAMPLE 28

To 660 g. of methyltriacetoxylsilane, 324 g. of diphenylsilanediol was added over a 2 minute period during which time the temperature increased to 68° C. The reaction mixture was cooled to 40° C. with a water bath and stirred for 35 minutes before adding 162 g. of diphenylsilanediol over a one minute period. The reaction mixture was stirred 40 minutes before adding 12.9 g. of the monomethyldiacetoxysiloxy endblocked polydimethylsiloxane described in Example 27 in 113 g. of xylene. This mixture was diluted with 875 g. of xylene and then added to 2160 g. of water over a five minute period during which time the temperature increased from 33° C. to 38° C. This hydrolysis mixture was heated to 60° C. over a one hour period and then at 64° C. for an additional hour. The hydrolysis mixture separated into two layers, an aqueous layer and a product layer. The product layer was washed twice with water and azeotroped to remove any remaining water and 322 g. of xylene. The product layer was then heated at reflux for 4 hours. The resulting product was a modified hydroxylated monomethylsiloxane-diphenylsiloxane copolymer having 57 mol percent monomethylsiloxane units and 43 mol percent diphenylsiloxane units based on the total number of monomethylsiloxane units and diphenylsiloxane units, 1.76 weight percent polydimethylsiloxane segments based on the total weight of the modified copolymer, 4.29 weight percent silicon-bonded hydroxyl radicals which were bonded to the monomethylsiloxane units based on the total weight of the modified copolymer, and a weight loss of 5.4 percent after 3 hours.

The above modified hydroxylated monomethylsiloxane-diphenylsiloxane copolymer catalyzed with ferric octoate and cured gave a pencil hardness of H both at room temperature and at 149° C., since the film was deposited on an aluminum substrate a pencil hardness of H represents the maximum pencil hardness obtainable. The cured film also exhibited good release properties.

EXAMPLE 29

A number of the above hydroxylated monomethylsiloxane-diphenylsiloxane copolymers and modified hydroxylated monomethylsiloxane-diphenylsiloxane copolymers were coated on test panels and test trays and the following test for food release properties were carried out: Tape pull test, egg release test and pizza burn test. The test panels were prepared as described herein unless otherwise indicated. The results are shown in Table I.

TABLE I

| Run Number | Hydroxylated monomethylsiloxane-diphenylsiloxane copolymer or modified variation | Tape pull test after cure, grams/inch | Release test after cure | After 120 minute isopropyl alcohol extraction | | Tape pull test after pizza burn test, grams/inch | | | Egg release test after third pizza burn test |
|---|---|---|---|---|---|---|---|---|---|
| | | | | Tape pull test, grams/inch | Egg release test | First test | Second test | Third test | |
| 1 [1] | Example 2 | 55 | Very good | 60 | Very good | 230 | 280 | 340 | Poor. |
| 2 [1] | Example 3 | 105 | do | 125 | do | 400 | 530 | 600 | Do. |
| 3 | Example 4 | 340 | Good | 470 | Fair | 450 | 500 | 650 | Do. |
| 4 [2] | Example 4 | 70 | do | 120 | Good | 200 | 450 | 600 | Do. |
| 5 | Example 7(C) | 120 | Very good | 145 | Very good | 600 | | | Fair.[3] |
| 6 | Example 8(B) | 120 | do | 90 | do | 450 | 700 | 650 | Poor. |
| 7 | Example 8(C) | 130 | do | 90 | do | 450 | 600 | 650 | Do. |
| 8 | Example 9 | 70 | do | 50 | do | 450 | 800 | | Fair.[4] |
| 9 | Example 10 | 450 | Good | 600 | Good | 550 | 600 | 700 | Do. |
| 10 | Example 10 [5] | 160 | do | 100 | do | 200 | 150 | 350 | Do. |
| 11 | Example 11 | 250 | do | 275 | do | 500 | 700 | 650 | Poor. |
| 12 | Example 12(A) | 35 | do | 30 | do | 300 | 300 | 400 | Fair. |
| 13 [1] | Example 14 | 30 | | | | | | | |
| 14 [2] | Example 14 | 10 | Good | 20 | Very good | 80 | 230 | 350 | Poor. |
| 15 [1] | Example 15 | 15 | do | 160 | Good | 440 | | | |
| 16 [1] | Example 16 | 70 | do | 450 | do | 350 | 550 | 650 | Fair. |
| 17 [1] | Example 17 | 20 | do | 145 | do | 330 | 480 | 500 | Good. |
| 18 | Example 19 | 30 | do | 80 | do | 70 | 200 | 150 | Do. |
| 19 | Example 20 | 120 | do | 250 | do | 150 | 450 | 500 | Fair. |
| 20 | Example 21(A) | 20 | do | 60 | do | 55 | 350 | 450 | Do. |
| 21 | Example 21(B) | 130 | do | 130 | do | 350 | 500 | 700 | Poor. |
| 22 | Example 22 | 140 | Fair | 120 | Fair | 500 | 700 | 700 | Do. |
| 23 [1] | Example 27(D) | 70 | do | 100 | Good | 125 | 155 | 150 | Good. |
| 24 | Example 28 | 125 | Very good | 200 | Very good | 100 | 350 | 400 | Fair. |
| 25 | Example 21(A) [6] | 5 | Good | 10 | Good | 100 | 180 | 150 | Poor. |
| 26 [1] | Example 23 | | do | | | | | | |
| 27 | Example 24(A) | 75 | Very good | 50 | Very good | 525 | 600 | | Fair.[4] |
| 28 | Example 24(B) | | Good | | | | | | |

[1] The hydroxylated copolymers and the modified variations were blended with 0.8 weight percent, based on the weight of the copolymer, of a polydimethylsiloxane containing methylhydrogensiloxane units in an amount to provide 0.038 weight percent silicon-bonded hydrogen atoms and having a viscosity of 4,000 cs. at 25° C.
[2] Modified hydroxylated monomethylsiloxane-diphenylsiloxane copolymer and polydimethylsiloxane heated in the presence of triethanolamine before coating of test panel.
[3] After first pizza burn test.
[4] After second pizza burn test.
[5] 4.0 weight percent of a monomethyldiacetoxysiloxy endblocked polydimethylsiloxane added and mixture agitated two hours at room temperature before test panels are coated.
[6] Coating 50 weight percent in xylene instead of 20 weight percent solids.

EXAMPLE 30

Laminates were prepared from the hydroxylated monomethylsiloxane - diphenylsiloxane copolymers, as shown in Table II. The hydroxylated monomethylsiloxane copolymers were catalyzed with a conventional catalyst for silanol condensation and glass cloth was hand dipped in the catalyzed solutions to impregnate the glass cloth with resin. The impregnated glass cloth was air dried for 10 minutes, precured for 10 minutes at 110° C. and then cut in six inch squares. Laminates containing 14 plies were molded for 30 minutes at 175° C. and 30 p.s.i. and then post cured for 16 hours at 90° C. The temperature was then increased to 250° C. at the rate of 16° C. per hour and held at 250° C. for 12 hours. The room temperature flexual strength and the flexual strentgh at 316° C. were determined and are as shown in Table II. The resin content of the laminates is also shown in Table II. A laminate was prepared as described above from the hydroxylated monomethylsiloxane-diphenylsiloxane copolymer of Example 14. The laminate was held at 250° C. for 54 hours before the first flexual strength measurements were made and then the laminate was placed in a 250° C. oven for several weeks and the flexual strength was determined at the end o feach week. The results are in Table II–A.

TABLE II

| Run Number | Hydroxylated monomethylsiloxane-diphenylsiloxane copolymer | Weight percent resin in laminate | Flexual strength, p.s.i. | |
|---|---|---|---|---|
| | | | Room temperature | At 316° C |
| 1 | Example 14 | 28.2 | 48,600 | 3,770 |
| 2 | Example 15 | 31.4 | 45,900 | 3,000 |
| 3 | Example 16 | 25.5 | 37,100 | 11,300 |
| 4 | Example 17 | 23.5 | 36,100 | 14,300 |
| 5 | Example 23 [1] | | 50,400 | 14,167 |
| 6 | ([2]) | 31.6 | 12,000 | 760 |

[1] Held at 250° C. for 54 hours instead of 12 hours.
[2] Prepared like the hydroxylated monomethylsiloxane-diphenylsiloxane copolymer of Example 14, except one half the molar amount of methyltriacetoxysilane was replaced by phenyltriacetoxysilane. Presented for comparative purposes only.

TABLE II–A

| | Flexual strength, p.s.i. | |
|---|---|---|
| Time of heating at 250° C.: | Room temperature | At 316° C. |
| Initial | 43,375 | 3,083 |
| 1 week | 51,850 | 6,113 |
| 2 weeks | 44,550 | 9,765 |
| 3 weeks | 41,500 | 12,050 |
| 4 weeks | 45,650 | 19,063 |
| 5 weeks | 40,575 | 18,163 |
| 6 weeks | 39,713 | 18,475 |
| 7 weeks | 41,800 | 18,138 |
| 8 weeks | 32,200 | 16,000 |

EXAMPLE 31

Coil bond strength tests were preformed on the hydroxylated monomethylsiloxane-diphenylsiloxane copolymers and modified hydroxylated monomethylsiloxane-diphenylsiloxane copolymers as shown in Table III. The coil bond strengths were determined by ASTM Designation: D2519–55T.

TABLE III

| Run number | Hydroxylated monomethylsiloxane-diphenylsiloxane copolymer or modified variation | Curing time and temperature | | Coil bond strength, pounds | |
|---|---|---|---|---|---|
| | | Hours | ° C. | At room temperature | At 100° C. |
| 1 | Example 12(B) | 6.0 | 250 | 20.0 | 14.0 |
| 2 | Example 14 | 0.5 | 232 | 28.0 | 13.6 |
| 3 | Example 14 | 6.0 | 250 | | 25.0 |
| 3 | Example 14 | 6.0 | 250 | | 25.0 |
| 4 | Example 14 | 48.0 | 250 | | 29.0 |
| 5 | Example 16 | 1.0 | 232 | 3.5 | 1.6 |
| 6 | Example 17 | 1.0 | 232 | 3.5 | 4.2 |
| 7 | Example 19 | 6.0 | 250 | 25.0 | 21.0 |
| 8 | Example 27(C) | 6.0 | 250 | 19.0 | 17.5 |
| 9 | Example 27(C) | 48.0 | 250 | 31.0 | 15.5 |
| 10 | Example 27(D) | 1.0 | 232 | 19.1 | 17.5 |

EXAMPLE 32

The modified hydroxylated monomethylsiloxane-diphenylsiloxane copolymer of Example 24(A) was catalyzed with iron octoate (0.05 weight percent iron), coated on four test panels and then cured as indicated

27 in Table IV. The oil resistance test was performed and the results are as indicated in Table IV. Two commercial silicone release coatings were also cured on test panels for comparative purposes.

TABLE IV

| | Cure | | Number of cycle | | | | |
|---|---|---|---|---|---|---|---|
| | Time, | Temperature | 1 | 2 | 3 | 4 | 5 |
| Example 24(A) | 15 | 177 | 25 | 14 | 1 | | |
| | 30 | 177 | 25 | 25 | 25 | 25 | 25 |
| | 15 | 204 | 25 | 25 | 25 | 25 | 25 |
| | 30 | 204 | 25 | 25 | 25 | 25 | 25 |
| Commercial Coating A | 15 | 177 | 1 | | | | |
| | 30 | 177 | 1 | | | | |
| | 15 | 204 | 1 | | | | |
| | 30 | 204 | 1 | | | | |
| Commercial Coating B | 15 | 177 | 1 | | | | |
| | 30 | 177 | 1 | | | | |
| | 15 | 204 | 2 | 1 | | | |
| | 30 | 204 | 5 | 1 | | | |

EXAMPLE 33

To 330 g. of methyltriacetoxysilane, 324 g. of diphenylsilanediol was added over an 8 minute period during which time the temperature increased to 52° C. The reaction mixture was stirred for one hour before vacuum stripping to 130° C. at aspirator pressure. The resulting product was an acetoxymonomethylsiloxane-diphenylsiloxane copolymer having 50 mol percent diphenylsiloxane units and 50 mol percent monomethylsiloxane units with 19.7 weight percent silicon-bonded acetoxy groups attached to the monomethylsiloxane units and a viscosity of 16,358 cs. at 25° C. and 100 weight percent solids.

Mixed 201 g. of the above acetoxymonomethylsiloxane-diphenylsiloxane copolymer and 17 g. of a hydroxyl endblocked polyphenylmethylsiloxane having an average of 7.5 phenylmethylsiloxane units per molecule in 27.75 g. of toluene and stirred at room temperature for 0.5 hour, added 125 g. of dry toluene and heated to 75° C. and held for 0.5 hour for a total heating time of 2 hours. The reaction mixture was cooled and then vacuum stripped to 110° C. at aspirator pressure for 10 minutes. To the resulting mixture, 150 g. of dry toluene was added. The resulting product was a modified acetoxymonomethylsiloxane-diphenylsiloxane copolymer.

To a mixture of 20 g. of isopropyyl alcohol and 295.35 g. of water, 343.4 g. of the above modified acetoxymonomethylsiloxane-diphenylsiloxane copolymer solution was added over a 15 minute period. The resulting reaction mixture was heated to 85° C. for one hour, cooled to room temperature and washed with a 15 weight percent sodium chloride in isopropyl alcohol solution. The aqueous layer and the product layers were separated. The product layer was washed until neutral with a sodium bicarbonate-water solution. The product layer was filtered and then azeotroped to remove any remaining water. The resulting product solution was heated at reflux for one hour. The resulting product was a modified hydroxylated monomethylsiloxane-diphenylsiloxane copolymer having 50 mol percent diphenylsiloxane units and 50 mol percent monomethylsiloxane units based on the total number of diphenylsiloxane units and monomethylsiloxane units, 9.5 weight percent of polyphenylmethylsiloxane segments based on the total weight of the modified copolymer, a viscosity of 9.92 cs. at 25° C. and 50 weight percent solids, 4.45 weight percent silicon-bonded hydroxyl radicals which are bonded to the monomethylsiloxane units based on the total weight of the modified copolymer, a weight loss of 6.2 percent after 3 hours, 7.9 percent after 24 hours, and 11.3 percent after 100 hours. A film of the modified hydroxylated monomethylsiloxane-diphenylsiloxane copolymer catalyzed with 0.1 weight percent iron added at iron octoate and cured for 1.5 minutes at 250° C. had a hardness of 66 on the Sward Rocker scale, a mandrel flex of 3/8 inch for 0.5 mil thickness and a hot tack of 1.

EXAMPLE 34

To a flask, 330 g. (1.5 mole) of methyltriacetoxylsilane was added and 324 g. (1.5 mole) of diphenylsilanediol was then added to the methyltriacetoxylsilane over a 10 minute period. The mixture was agitated for one hour and then vacuum stripped to 132° C. at 40 mm. of Hg whereby 170 g. (180 g. theory) of acetic acid was collected The resulting product was a clear, colorless and viscous acetoxymonomethylsiloxane-diphenylsiloxane copolymer at room temperature. The acetoxymonomethylsiloxane-diphenylsiloxane copolymer was dissolved in 484 g. of dry toluene. The acetoxymonomethylsiloxane-diphenylsiloxane copolymer was 50 mol percent diphenylsiloxane units and 50 mol percent monomethylsiloxane units with the acetoxy groups attached to the silicon atoms of the monomethylsiloxane units. The accetoxymonomethylsiloxane-diphenylsiloxane copolymer was 18.67 weight percent acetoxy.

In a flask, 347.4 g. of the above acetoxymonomethylsiloxane-diphenylsiloxane copolymer solution and 23.8 g. of a hydroxyl endblocked polyphenylmethylsiloxane polymer having a molecular weight of 937 were mixed. The mixture was heated to 75 to 80° C. for two hours and then vacuum stripped to 112° C. at 6 mm. of Hg for 30 minutes whereby 173.2 g. of volatiles were collected. The product was a modified acetoxymonomethylsiloxane-diphenylsiloxane copolymer which had a viscosity of 6.6 cs. at 25° C. at 48.9 percent solids in toluene and 16.36 weight percent acetoxy. The modified acetoxymonomethylsiloxane-diphenylsiloxane copolymer was a copolymer wherein acetoxymonomethylsiloxane-diphenylsiloxane copolymer molecules were linked together by segments of polyphenylmethylsiloxane.

To a mixture of 285 g. of water and 20 g. of isopropyl alcohol, 341.2 g. of the above modified acetoxymonomethylsiloxane-diphenylsiloxane copolymer solution was added and stirred for 40 minutes. The reaction mixture was then refluxed for one hour, cooled, and the phases separated with the aid of a 20 weight percent NaCl in isopropyl alcohol-water solution and the product layer was washed three times with 400 g. of the solution. The product phase was neutralized with sodium bicarbonate and then washed with a 50—50 weight mixture of water and isopropyl alcohol. The resulting product solution was azeotroped to remove any remaining water and then refluxed for an additional hour. The resulting product was a modified hydroxylated monomethylsiloxane-diphenylsiloxane copolymer having 50 mol percent monomethylsiloxane units and 50 mol percent diphenylsiloxane units based on the total number of monomethylsiloxane units and diphenylsiloxane units, 15.5 weight percent of polyphenylmethylsiloxane segments based on the total weight of the modified hydroxylated copolymer, 10 weight percent silicon-bonded hydroxyl radicals which are bonded to the monomethylsiloxane units based on the total weight of the modified hydroxylated copolymer, a viscosity of 7.4 cs. at 25° C. and 45.4 weight percent solids, and a weight loss of 2.2 percent after 3 hours.

The modified hydroxylated monomethylsiloxane-diphenylsiloxane copolymer was catalyzed with iron octoate and cured as shown in Table V.

TABLE V

| Percent iron added as iron octoate | Cure | | Hot tack | Sward Rocker hardness | Flexibility | Film thickness, mil |
|---|---|---|---|---|---|---|
| | Time, seconds | Temperature, ° C. | | | | |
| 0.2 | 90 | 250 | 1 | 48 | 3T | 0.8 |
| 0.1 | 90 | 250 | 1 | 62 | 1T | 1.0 |
| 0.05 | 90 | 250 | 1 | 40 | 2T | 0.6 |
| 0.1 | 30 | 250 | 5 | 18 | 1T | 0.9 |
| 0.1 | 45 | 250 | 5 | 34 | 2T | 0.8 |
| 0.1 | 60 | 250 | 2 | 50 | 1T | 0.8 |
| 0.1 | 75 | 250 | 2 | 46 | 2T | 1.0 |

A paint was prepared from the modified hydroxylated monomethylsiloxane-diphenylsiloxane copolymer catalyzed with 0.1 weight percent iron added as iron octoate based on the weight of the modified hydroxylated monomethylsiloxane-diphenylsiloxane copolymer. The paint formulation was a standard paint with conventional pigments containing 32.2 weight percent of the copolymer. The paint was cured and tested as described in Table VI.

TABLE VI

| Time, seconds | Temperature, °C. | Hot tack | Sward Rocker hardness | Mandrel flexibility, inch | Film thickness, mil |
|---|---|---|---|---|---|
| 45 | 250 | 3 | 32 | ⅛ | 1.0 |
| 60 | 250 | 1 | 42 | 5/16 | 1.0 |
| 75 | 250 | 1 | 38 | 5/16 | 1.1 |
| 90 | 250 | 1 | 38 | ⅛ | 1.0 |
| 120 | 250 | 1 | 32 | ½ | 1.0 |
| 90 | 200 | 4 | 36 | 7/16 | 1.2 |
| 90 | 150 | 5 | 32 | 1 | 1.2 |

EXAMPLE 35

To 376 g. (1.71 mole) of methyltriacetoxysilane, 259 g. (1.20 mole) of diphenylsilanediol was added over a 10 minute period. The mixture was stirred for 45 minutes and then vacuum stripped to 143° C. at 40 mm. of Hg whereby 130 g. of acetic acid was collected. The resulting product was an acetoxymonomethylsiloxane-diphenylsiloxane copolymer of 41.0 mol percent diphenylsiloxane units and 59.0 mol percent monomethylsiloxane units with the acetoxy groups attached to silicon atoms of the monomethylsiloxane units. The acetoxymonomethylsiloxane-diphenylsiloxane copolymer was 32.2 weight percent acetoxy (theory 32.8%). The acetoxymonomethylsiloxane-diphenylsiloxane copolymer was dissolved in 491 g. of toluene.

To 298.5 g. (49.3 weight percent acetoxymonomethylsiloxane-diphenylsiloxane copolymer) of the above acetoxymonomethylsiloxane-diphenylsiloxane copolymer solution, 37.7 g. of a hydroxyl endblocked polyphenylmethylsiloxane having a cryoscopic molecular weight of 937 and 0.95 weight percent silicon-bonded hydroxyl radicals was added and the mixture heated at 95° C. for 85 minutes. The resulting mixture was stripped to 120° C. at 10 mm. of Hg whereby 158.1 g. of volatiles were collected. To the resulting product 107.7 g. of dry toluene was added to provide a solution of a modified acetoxymonomethylsiloxane-diphenylsiloxane copolymer of 25.75 weight percent acetoxy where molecules of the acetoxymonomethylsiloxane-diphenylsiloxane copolymer prepared above were linked together by segments of polyphenylmethylsiloxane. The polyphenylmethylsiloxane segments were about 21 weight percent of the total weight of the modified acetoxymonomethylsiloxane-diphenylsiloxane copolymer.

To 386 g. of water, 255 g. of the above modified acetoxymonomethylsiloxane-diphenylsiloxane copolymer solution was added over a 10 minute period. The reaction mixture was heated for one hour between 90° to 100° C. The aqueous phase was separated from the product phase and the product phase was washed three times with a sodium chloride-water solution. The product phase was neutralized with 50 g. of sodium bicarbonate and then washed with an aqueous sodium chloride solution. The resulting product solution was azeotroped for 15 minutes to remove any remaining water, refluxed for one hour and then filtered. The resulting product was a modified hydroxylated monomethylsiloxane-diphenylsiloxane copolymer having 41 mol percent diphenylsiloxane units and 59 mol percent monomethylsiloxane units, 26 weight percent polyphenylmethylsiloxane segments based on the total weight of the modified hydroxylated copolymer, 2.46 weight percent silicon-bonded hydroxyl radicals which are bonded to the monomethylsiloxane units based on the total weight of the modified hydroxylated copolymer, a viscosity of 11.2 cs. at 25° C. and 52.5 weight percent solids, a weight loss of 4.1 percent after 3 hours, 5.8 percent after 24 hours and 6.9 percent after 100 hours.

A film of the above modified hydroxylated monomethylsiloxane-diphenylsiloxane copolymer catalyzed with 0.1 weight percent iron added as iron octoate based on the weight of the modified hydroxylated copolymer cured for 90 seconds at 250° C. and 1.0 mil thick, had a hot tack of 1, a Sward Rocker hardness of 50 and a flexibility of 2T.

A paint prepared as described in Example 34 from the above modified hydroxylated monomethylsiloxane-diphenylsiloxane copolymer and cured for 90 seconds at 250° C. had a film thickness of 1.7 mils, a hot tack of 1, a Sward Rocker hardness of 34 and a mandrel flexibility of 7/16 inch.

EXAMPLE 36

To 990 g. (4.5 mole) of methyltriacetoxysilane, 972 g. (4.5 mole) of diphenylsilanediol were added over a 30 minute period. The mixture was stirred overnight at room temperature and then vacuum stripped for 30 minutes at 124° C. at 18 mm. of Hg. The resulting product was an acetoxymonomethylsiloxane-diphenylsiloxane copolymer of 50 mol percent diphenylsiloxane units and 50 mol percent monomethylsiloxane units with the acetoxy groups attached to the silicon atoms of the monomethylsiloxane units. The acetoxymonomethylsiloxane-diphenylsiloxane copolymer had 19.87 weight percent acetoxy and when dissolved in 1422 g. of toluene, the acetoxymonomethylsiloxane-diphenylsiloxane copolymer had a viscosity of 3.99 cs. at 25° C. at 47.3 weight percent solids.

To 474 g. of the above acetoxymonomethylsiloxane-diphenylsiloxane copolymer solution, 96.9 g. of the hydroxyl endblocked polyphenylmethylsiloxane described in Example 13 was added and the mixture was heated at 92° C. for 1.25 hours. The resulting mixture was cooled and then vacuum stripped to 112° C. at 12 mm. of Hg whereby 236.1 g. of volatiles were collected. The resulting product was a modified acetoxymonomethylsiloxane-diphenylsiloxane copolymer of 9.83 weight percent acetoxy where molecules of the acetoxymonomethylsiloxane-diphenylsiloxane copolymer were linked together by segments of polyphenylmethylsiloxane. The polyphenylmethylsiloxane segments were about 30 weight percent of the total weight of the modified acetoxymonomethylsiloxane-diphenylsiloxane copolymer. When the modified acetoxymonomethylsiloxane-diphenylsiloxane copolymer was dissolved in toluene to provide at 48 weight percent solution of polymer, the viscosity was 5.46 cs. at 25° C.

To 1026 g. of water, 665.7 g. of the above modified acetoxymonomethylsiloxane-diphenylsiloxane copolymer solution was added over a 0.5 hour period. This reaction mixture was heated at 92° C. for one hour, cooled, the aqueous layer was separated from the product layer with the aid of an aqueous sodium chloride solution, the product layer was neutralized with sodium bicarbonate and then washed with an aqueous sodium chloride-isopropyl alcohol solution. The product solution was allowed to stand 48 hours at room temperature, it was then filtered. The resulting product solution was azeotroped to remove any remaining water, and refluxed for 1.25 hours. The resulting product was a modified hydroxylated monomethylsiloxane-diphenylsiloxane copolymer having 50 mol percent diphenylsiloxane units and 50 mol percent monomethylsiloxane units based on the total number of monomethylsiloxane units and diphenylsiloxane units, 32 weight percent polyphenylmethylsiloxane segments based on the total weight of the modified hydroxylated copolymer, a viscosity of 5.82 cs. at 25° C. and 44.2 weight percent solids, 5.11 weight percent silicon-bonded hydroxyl radicals which are bonded to the monomethylsiloxane units based on the total weight of the modified hydroxylated copolymer, and a weight loss of 5.0 percent after 3 hours.

A cured, clear film of the above modified hydroxylated monomethylsiloxane-diphenylsiloxane copolymer catalyzed with 0.1 weight percent iron added as iron octoate had a hot tack of 1, a Sward Rocker hardness of 30, a flexibility of 1T with a film thickness of 0.9 mils.

EXAMPLE 37

An acetoxymonomethylsiloxane-diphenylsiloxane copolymer having 50 mol percent monomethylsiloxane units and 50 mol percent diphenylsiloxane was prepared as described in Example 36.

The following hydroxyl endblocked polydiorganosiloxanes having both phenylmethylsiloxane units and dimethylsiloxane units were added in an amount of 15 weight percent based on the combined weight of the hydrolyzed acetoxymonomethylsiloxane-diphenylsiloxane copolymer and the hydroxyl endblocked polydiorganosiloxane to the acetoxymonomethylsiloxane-diphenylsiloxane copolymer. These mixtures were hydrolyzed and recovered as described in Example 36.

TABLE VII

| Hydroxyl endblocked polydiorganosiloxane | Mol percent | | Weight percent SiOH | Viscosity, cs. at 25° C. | Cryoscopic molecular weight |
|---|---|---|---|---|---|
| | (CH$_3$)$_2$SiO | (C$_6$H$_5$)(CH$_3$)SiO | | | |
| A | 5 | 95 | 2.32 | 889 | 1,110 |
| B | 10 | 90 | 2.21 | 716 | 1,170 |
| C | 20 | 80 | 2.00 | 554 | 1,120 |
| D | 30 | 70 | 2.01 | 306 | 1,090 |
| E | 35 | 65 | 2.41 | 231 | 1,040 |

The resulting products were modified hydroxylated monomethylsiloxane-diphenylsiloxane copolymers having 50 mol percent diphenylsiloxane units and 50 mol percent monomethylsiloxane units based on the total number of monomethylsiloxane units and diphenylsiloxane units and 15 weight percent of the corresponding polydiorganosiloxane segments based on the total weight of the modified hydroxylated monomethylsiloxane-diphenylsiloxane copolymer. The properties are described in Table VIII.

TABLE VIII

| Modified hydroxylated monomethylsiloxane-diphenyl-siloxane copolymer [1] | Weight percent silicon-bonded hydroxyl radicals [2] | Weight loss after 3 hours at 250° C., percent | Viscosity at 25° C. at the indicated solids | |
|---|---|---|---|---|
| | | | In cs. | percent solids |
| A | 4.13 | 2.2 | 6.58 | 48.9 |
| B | 4.70 | 2.9 | 7.98 | 52.1 |
| C | 3.85 | 5.5 | 6.06 | 49.4 |
| D | 3.92 | 4.1 | 3.85 | 43.1 |
| E | 4.55 | 2.3 | 5.96 | 48.6 |

[1] Identified by the polydiorganosiloxane segment.
[2] Based on total weight of modified copolymer.

Clear, cured films of the above modified hydroxylated monomethylsiloxane - diphenylsilovane copolymer catalyzed with 0.1 weight percent iron added as iron octoate based on the total weight of the modified hydroxylated monomethylsiloxane-diphenylsiloxane copolymer were cured by heating at 250° C. for 90 seconds. The films had the properties shown in Table IX.

TABLE IX

| Modified copolymer | Hot tack | Sward Rocker hardness | Flexibility | Film thickness, mils |
|---|---|---|---|---|
| A | 1 | 58 | 2T | 1.0 |
| B | 1 | 74 | 2T | 1.0 |
| C | 1 | 64 | 1T | 1.0 |
| D | 1 | 70 | 2T | 1.2 |
| E | 1 | 72 | 2T | 1.2 |

Paints prepared from the modified hydroxylated monomethylsiloxane-diphenylsiloxane copolymers according to the procedure described in Example 34 had film properties when cured for 90 seconds at 250° C. as shown in Table X.

TABLE X

| Modified copolymer | Hot tack | Sward Rocker hardness | Mandrel flexibility, inches | Film thickness, mils |
|---|---|---|---|---|
| A | 1 | 32 | 13/16 | 1.0 |
| B | 1 | 50 | 7/16 | 1.0 |
| C | 1 | 40 | 19/16 | 1.0 |
| C | 1 | 42 | 9/16 | 1.0 |
| E | 1 | 55 | 13/16 | 1.1 |

EXAMPLE 38

To 582.5 g. of methyltriacetoxysilane, 507.5 g. of diphenylsilanediol was added. This reaction mixture was heated for one hour at 65° to 75° C. and then allowed to stand overnight. The resulting mixture was vacuum stripped to 115° C. at 0.65 mm. of Hg. The resulting product was an acetoxymonomethylsiloxane-diphenylsiloxane copolymer having 47 mol percent diphenylsiloxane units and 53 mol percent monomethylsiloxane units.

A mixture of 316.45 g. of the above acetoxymonomethylsiloxane-diphenylsiloxane copolymer, 200 g. of toluene and 37.45 g. of a monomethyldiacetoxysiloxy endblocked polydimethylsiloxane having an average of 11 dimethylsiloxane units per molecule was prepared. To this mixture, 531 g. of water was added, stirred for 15 minutes and then heated at 60° C. to 65° C. for one hour. The resulting two phase system was cooled, separated and the product phase washed until neutral. The aqueous phase was discarded and the product phase filtered and then heated at reflux for 10 hours. The resulting product was a modified hydroxylated monomethylsiloxane-diphenylsiloxane copolymer having 45.6 mol percent diphenylsiloxane units and 54.4 mol percent monomethylsiloxane units based on the total number of monomethylsiloxane units and diphenylsiloxane units, 9.4 weight percent polydimethylsiloxane segments based on the total weight of the modified hydroxylated copolymer and 2.09 weight percent silicon-bonded hydroxyl radicals which are bonded to the monomethylsiloxane units based on the total weight of the modified hydroxylated copolymer.

A clear, cured film of the above modified hydroxylated monomethylsiloxane-diphenylsiloxane copolymer catalyzed with 0.1 weight percent iron added as iron octoate based on the total weight of the modified hydroxylated copolymer and cured for 90 seconds at 250° C. had a hot tack of 1, a flexibility of 3T at a film thickness of 1.0 mil.

EXAMPLE 39

When the procedure of Example 19 is followed, except when the following ingredients are used, the modified hydroxylated monomethylsiloxane-diphenylsiloxane copolymer is obtained as indicated.

(A)

660 g. of methyltriacetoxysilane
486 g. of diphenylsilanediol
6.5 g. of a hydroxyl endblocked polydimethylsiloxane having an average of 1000 dimethylsiloxane units per molecule.

A modified hydroxylated monomethylsiloxane-diphenylsiloxane copolymer having 43 mol percent diphenyl siloxane units and 43 mol percent diphenylsiloxane units based on the total number of monomethylsiloxane units and diphenylsiloxane units and 1.0 weight percent polydimethylsiloxane segments based on the total weight of the modified copolymer is obtained.

(B)

660 g. of methyltriacetoxysilane
486 g. of diphenylsilanediol
71.9 g. of a hydroxyl endblocked polydimethylsiloxane having an average of 750 dimethylsiloxane units per molecule.

A modified hydroxylated monomethylsiloxane-diphenylsiloxane copolymer having 43 mol percent diphenylsiloxane units and 57 mol percent monomethylsiloxane units based on the total number of monomethylsiloxane units and diphenylsiloxane units and 10 weight percent polydimethylsiloxane segments based on the total weight of the modified copolymer is obtained.

(C)

660 g. of methyltriacetoxysilane
486 g. of diphenylsilanediol
161.6 g. of a hydroxyl endblocked polydimethylsiloxane having an average of 100 dimethylsiloxane units per molecule.

A modified hydroxylated monomethylsiloxane-diphenylsiloxane copolymer having 57 mol percent monomethylsiloxane units and 43 mol percent diphenylsiloxane units based on the total number of monomethylsiloxane units and diphenylsiloxane units and 20 weight percent polydimethylsiloxane segments based on the total weight of the copolymer is obtained.

(D)

660 g. of methyltriacetoxysilane
486 g. of diphenylsilanediol
215.6 g. of a hydroxyl endblocked polydimethylsiloxane having an average of 500 dimethylsiloxane units per molecule.

A modified hydroxylated monomethylsiloxane-diphenylsiloxane copolymer having 57 mol percent monomethylsiloxane units and 43 mol percent diphenylsiloxane units based on the total number of diphenylsiloxane units and monomethylsiloxane units and 25 weight percent polydimethylsiloxane segments based on the total weight of the modified copolymer is obtained.

(E)

A modified hydroxylated monomethylsiloxane-diphenylsiloxane copolymer having 57 mol percent monomethylsiloxane units and 43 mol percent diphenylsiloxane units based on the total number of diphenylsiloxane units and monomethylsiloxane units and 25 weight percent polydimethylsiloxane segments based on the total weight of the modified copolymer is obtained.

(E)

660 g. of methyltriacetoxysilane
486 g. of diphenylsilanediol
277 g. of a hydroxyl endblocked polydimethylsiloxane having an average of 100 dimethylsiloxane units per molecule.

A modified hydroxylated monomethylsiloxane-diphenylsiloxane copolymer having 57 mol percent monomethylsiloxane units and 43 mol percent diphenylsiloxane units based on the total number of monomethylsiloxane units and 30 weight percent polydimethylsiloxane segments based on the total weight of the modified copolymer is obtained.

(F)

660 g. of methyltriacetoxysilane
486 g. of diphenylsilanediol
656 g. of a hydroxylated polydimethylsiloxane having an average of 15 dimethylsiloxane units per molecule.

A modified hydroxylated monomethylsiloxane-diphenylsiloxane copolymer having an average of 43 mol percent diphenylsiloxane units and 57 mol percent monomethylsiloxane units based on the total number of monomethylsiloxane units and diphenylsiloxane units and 50 weight percent polydimethylsiloxane segments based on the total weight of the modified copolymer.

That which is claimed is:

1. A laminate comprising a composite of a glass cloth and a cured hydroxylated monomethylsiloxane-diphenylsiloxane copolymer consisting essentially of monomethylsiloxane units and diphenylsiloxane units in which the diphenylsiloxane units are present in an amount of from 20 to 50 inclusive mol percent based on the total number of siloxane units present in said hydroxylated monomethylsiloxane-diphenylsiloxane copolymer, at least 95 percent of the total number of diphenylsiloxane units having each unsatisfied valence of each diphenylsiloxane unit satisfied by a monomethylsiloxane unit, said hydroxylated monomethylsiloxane-diphenylsiloxane copolymer containing from 0.4 to 10 weight percent silicon-bonded hydroxyl radicals based on the total weight of the copolymer, and said hydroxyl radicals consisting essentially of hydroxyl radicals bonded to the monomethylsiloxane units.

References Cited
UNITED STATES PATENTS

| | | | |
|---|---|---|---|
| 3,325,449 | 6/1967 | Ceyzeriat et al. | 260—46.5 G |
| 3,537,948 | 11/1970 | Marzocchi | 161—193 |
| 2,486,162 | 10/1949 | Hyde | 260—46.5 R |
| 3,546,156 | 12/1970 | Baronnier et al. | 161—193 |
| 3,565,845 | 2/1971 | Johnson | 117—126 GS |

ROBERT F. BURNETT, Primary Examiner

G. W. MOXON II, Assistant Examiner

U.S. Cl. X.R.

117—126 GS; 161—193, 206